(12) United States Patent
Holland

(10) Patent No.: US 8,784,667 B2
(45) Date of Patent: *Jul. 22, 2014

(54) METHOD FOR PREVENTING SCALE DEPOSITS AND REMOVING CONTAMINANTS FROM FLUID COLUMNS

(71) Applicant: Wilsa, Inc., Houston, TX (US)

(72) Inventor: Herbert William Holland, Houston, TX (US)

(73) Assignee: Wilsa, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/924,163

(22) Filed: Jun. 21, 2013

(65) Prior Publication Data

US 2013/0277313 A1    Oct. 24, 2013

Related U.S. Application Data

(60) Division of application No. 13/317,627, filed on Oct. 22, 2011, now Pat. No. 8,480,890, which is a continuation of application No. 12/215,745, filed on Jun. 29, 2008, now Pat. No. 8,048,313, which is a continuation-in-part of application No. 11/054,131, filed on Feb. 10, 2005, now Pat. No. 7,407,589, which is a continuation-in-part of application No. 10/731,398, filed on Dec. 10, 2003, now Pat. No. 6,852,235, which is a continuation of application No. 10/372,731, filed on Feb. 23, 2003, now Pat. No. 6,706,196.

(51) Int. Cl.
*C02F 1/48* (2006.01)
*B03C 1/02* (2006.01)
*B01D 35/06* (2006.01)
*C02F 101/32* (2006.01)

(52) U.S. Cl.
CPC . *C02F 1/484* (2013.01); *C02F 1/48* (2013.01); *C02F 2303/22* (2013.01); *C02F 2201/483* (2013.01); *C02F 2101/32* (2013.01); *B03C 1/02* (2013.01); *B01D 35/06* (2013.01)
USPC ............... 210/695; 210/748.01; 210/748.16; 204/155; 204/554; 204/557

(58) Field of Classification Search
CPC ........ C02F 1/48; C02F 1/484; C02F 2303/22; C02F 2201/483; C02F 2101/32; B03C 1/02; B01D 35/06
USPC ........ 210/695, 748.01, 748.16, 222; 204/155, 204/554, 557
See application file for complete search history.

(56) References Cited

U.S. PATENT DOCUMENTS 4,938,875 A * 7/1990 Niessen .................. 210/695
5,074,998 A * 12/1991 De Baat Doelman ...... 210/222
6,706,196 B2 * 3/2004 Holland .................. 210/695

(Continued)

*Primary Examiner* — David A Reifsnyder
(74) *Attorney, Agent, or Firm* — Dunlap Codding, P.C.

(57) ABSTRACT

A method and apparatus of fluid treatment for a plurality of fluids with a first and a second non-magnetically conductive fluid flow conduit sleeved within at least one segment of magnetically conductive conduit providing a plurality of distinct areas of concentrated magnetic energy. The instant invention prevents the formation and accumulation of contaminants within conduits and on equipment utilized in the transportation, delivery and processing of fluid columns. It may also be utilized to accelerate the separation of oil and water and increase the efficiency of oil/water separation equipment.

9 Claims, 7 Drawing Sheets

(56) References Cited

U.S. PATENT DOCUMENTS

| | | | |
|---|---|---|---|
| 6,852,235 B2* | 2/2005 | Holland | 210/695 |
| 7,407,589 B2* | 8/2008 | Holland | 210/695 |
| 8,048,313 B2* | 11/2011 | Holland | 210/695 |
| 8,480,890 B2* | 7/2013 | Holland | 210/222 |

* cited by examiner

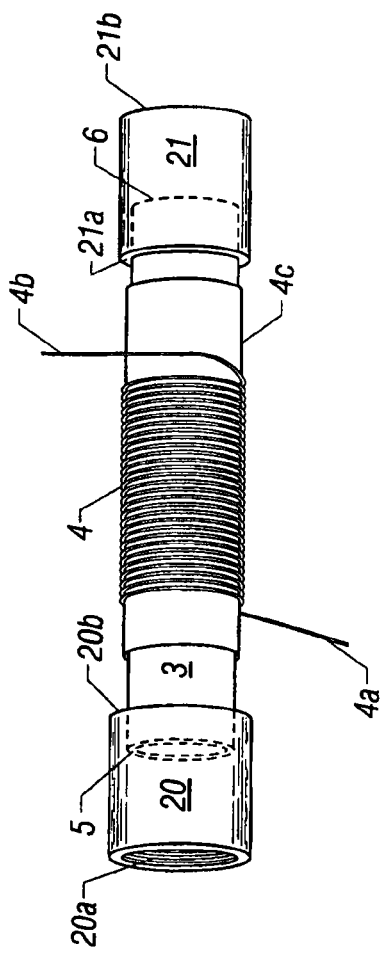
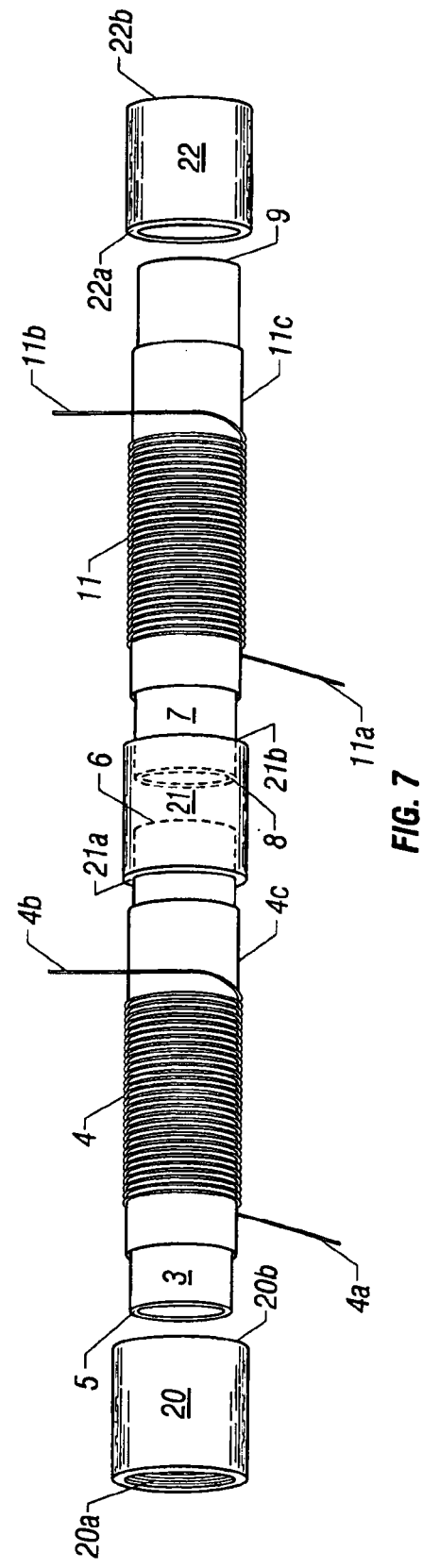
FIG. 6
FIG. 7

METHOD FOR PREVENTING SCALE DEPOSITS AND REMOVING CONTAMINANTS FROM FLUID COLUMNS

INCORPORATION BY REFERENCE

The present patent application is a divisional of the patent application identified by U.S. Ser. No. 13/317,627, filed on Oct. 22, 2011, which issued as U.S. Pat. No. 8,480,890, which is a continuation of U.S. Ser. No. 12/215,745, which issued as U.S. Pat. No. 8,048,313, which is a continuation in part of U.S. Ser. No. 11/054,131, which issued as U.S. Pat. No. 7,407,589, which is a continuation in part of U.S. Ser. No. 10/731,398, which issued as U.S. Pat. No. 6,852,235, which is a continuation of U.S. Ser. No. 10/372,731 which issued as U.S. Pat. No. 6,706,196, of which the entire content of each is hereby expressly incorporated by reference.

BACKGROUND OF THE INVENTION

The present invention relates to the prevention and removal of deposits such as scale, corrosion, paraffin and asphaltene that form within conduits and on the surfaces of equipment utilized in the transmission of fluid columns. The instant invention also provides for the separation of contaminants and other components that comprise a fluid column receptive to magnetic treatment.

It is common for contaminant deposits to accumulate within conduits and on equipment utilized in the transportation and transmission of fluids. For example, in oilfield pipelines a mixture of oil, water and minerals typically flow out of a well into apparatus utilized to separate marketable oil from water and other components of the fluid column. Paraffin, asphaltene and mineral scale deposits forming within conduits used to transport this fluid mixture restrict the flow of fluid within the pipeline. Further, such deposits and the congestion they create typically lead to the deterioration of pumps, valves, meters and other equipment utilized to propel and monitor the flow of fluid through a pipeline system. These types of deposits typically result in lost production and substantial expenditures for thermal, mechanical or chemical remediation to restore full flow capacity to a pipeline.

Many thermal exchange systems, such as cooling towers or boilers, utilize water as a heat transfer medium. Scale and corrosion deposits can restrict the flow of water and impede the efficient operation of pumps, valves and other equipment. Further, deposits on thermal exchange grids act as layers of insulation and inhibit the transfer of heat carried by the water. Periodic descaling of heat exchange equipment typically results in process downtime and substantial labor and remediation expenditures. Therefore, contaminant deposits result in restricted flow, lost efficiency and increased energy consumption in thermal exchange systems.

In closed-loop systems where water is continuously circulated to facilitate heat transfer from one area of a system to another, one common method of removing corrosion and scale deposits, along with controlling algae and bacterial growth, utilizes chemical treatment of the water. Over time, the build-up of chemicals, minerals and other contaminants within the water typically results in it being unfit for continued use. Further, chemical laden water typically requires additional treatment to make it suitable for discharge into the environment and usually incurs a substantial surcharge for its permitted release into a municipal wastewater disposal system. Chemical treatment of fluid columns is costly, requires the storage, handling and dispensing of dangerous chemicals and increasingly gives rise to growing environmental concerns directed to the quality of the water being discharged.

One alternative to chemical treatment is the utilization of magnetic field generators to introduce magnetic flux to a contaminated fluid column. Magnetic field generators are commonly divided into two distinct groups, permanent magnets and electromagnets. Each group utilizes magnetic energy to treat a fluid column. The density of the magnetic flux available in the fluid treatment area, which is typically the interior of a conduit through which a fluid flows, can be measured and is typically expressed in Gauss Oersted units. Commonly referred to as "gauss", this unit of measurement is useful in the comparison of magnetic fluid treatment devices. While the use of magnets has proven to provide positive benefits in the treatment of certain fluid columns, prior art magnetic field generators are challenged by a number of deficiencies.

Permanent magnets typically generate magnetic flux via a fixed array of rare earth magnets proximate the flow path of a fluid through a segment of conduit. Even though many types of permanent magnets have the capacity to generate large amounts of magnetic energy near their surface, the strength of their magnetic fields is fixed and cannot be adjusted. Further, when using a gauss meter to measure the magnetic energy of a permanent magnet, the strength of the magnetic energy tends to rapidly diminish as the probe of the gauss meter moves away from its surface. Therefore, effective magnetic treatment can best be realized by passing a fluid as close to the surface of a permanent magnet as possible.

The flow rate of a fluid as it passes through the fixed strength of a permanent magnet is a primary factor in determining the effectiveness of the treatment provided by such a device. Effective treatment of a contaminated fluid column may occur when the flow rate of a fluid is matched to a specific sized array of fixed magnets. If the velocity of a feedstock through a permanent magnet varies from the required flow rate, or the fluid passes too far from the surface of a permanent magnet, desired treatment of a fluid column may not occur. Thus, when the velocity of a fluid is not matched to a fixed ratio of conduit size to the length of a fixed magnetic field strength required to provide the conduction coefficients necessary for effective treatment, use of permanent magnets may result in lost efficiency or a total lack of magnetic fluid treatment.

Electromagnets may be formed by electrically charging a coil of an electrical conducting material, such as a length of metal wire. Coiling an electrically charged wire allows the magnetic field that radiates from the circumference of the wire to concentrate within the center of the coil of wire. Wrapping a strand of electrical conductor, such as a length of copper wire, around a conduit, such as segment of pipe, and connecting the ends of the electrical conductor to power supply is a common method of making an electromagnet. A basic principal of electromagnetic field generation states the strength of the magnetic field is determined by multiplying the number of turns of a coil of wire by the electrical current, or amperage, flowing through to the coil. This calculation of amperage and wire turns is commonly referred to as amp-turns, with the gauss provided by a simple electromagnet typically being proportional to its amp-turns. The magnetic field generated by an energized coil of wire may be strengthened by increasing the number of turns of wire, increasing the voltage supplied to the coil or increasing both the number of turns and the intensity of the electrical supply. The strength of the magnetic field generated by such a device may be increased or decreased by adjusting the voltage supplied to the coil of wire.

In addition to creating an electromagnetic field, this configuration of coiled electrically charged wire typically generates heat. Heat generation has been a major limitation in the development of the maximum electromagnetic field strength of prior art electromagnet devices. For example, heat generated by an electrically charged coil of wire increases the resistance within the coil of wire. This increased resistance results in a drop in the flow of current through the device and reduces the amp-turns, or gauss, of the electromagnet. Excessive heat generation typically leads to the failure of prior art electromagnet devices when heat retention within the coiled wire is sufficient to cause segments of the wire coil to melt and contact each other. The resulting short circuit reduces the efficiency of the device due to fewer amp-turns being in effect. Heat also causes the coil of wire to part and cause an open circuit so no magnetic field can be generated. The generation and retention of heat impedes the flow of current through the wire coil of prior art electromagnet devices and makes them less effective, or totally useless, in fluid treatment until the continuity in the entire electrical circuit is restored.

In some instances, a protective housing may be utilized to protect the coiled wire from cuts, abrasions or other damage. However, encasing a wire coil within a protective housing typically promotes the retention of heat generated by the energized coil. To disperse the heat from the coil, the protective housings of prior art devices are typically filled with mineral oil, graphite or other materials. Oil and other heat dispersing materials add significant weight to these prior art devices, making them difficult to handle and install. Further, the potential of oil or other heat dispersing materials leaking from the protective housings and causing damage to the environment, along with other maintenance issues, pose additional problems for end users.

Heat dissipation is critical to the overall efficiency and effectiveness of an electromagnetic filed generator. Heat generated by a wire coil contiguous with the outer surface of a conduit may radiate through the conduit and into a fluid flowing through it. Heat generated by the outer layer of a cluster of wire coiled around a conduit may dissipate into the atmosphere if the device is used in an open-air configuration or transferred through heat dispersing materials to the body of an enclosure and then into the atmosphere if it is encased within a protective housing. However, the inability of prior art devices to transfer and dissipate heat generated by their wire coils typically results in open circuits or short circuits. Thus, prior art devices are typically limited in the number of layers of coiled wire that may be utilized to produce an electromagnetic field generator due to the generation and retention of heat within a cluster of wire.

SUMMARY OF THE INVENTION

The instant invention provides a method and apparatus for use in the prevention of scale, corrosion, paraffin, asphaltene and other deposits within conduits utilized in the transmission of fluid columns by providing a feedstock receptive to magnetic treatment with a plurality of concentrated magnetic fields at distinct points. By subjecting a feedstock to a plurality of intense magnetic fields, substances such as silica, calcium carbonate, paraffin or asphaltenes tend to remain in suspension rather than adhere to the internal walls of conduits and equipment utilized to transport the fluid. The instant invention has also proven to be useful in accelerating the separation of oil and water, thereby increasing the efficiency of oil/water separation equipment.

Absent magnetic treatment, many substances are typically absorbed into ions that collect as adhesive-like substances within a fluid column and form deposits along the surface of the internal boundary walls of conduits utilized to transport fluids. Magnetic fluid treatment typically does not remove contaminants from a fluid column. Rather, it induces a similar charge to elements carried within a fluid column that significantly decreases their incidence of surface contact. This induced polarization results in similarly charged ions within a feedstock continuously repelling each other and typically eliminates the adhesive properties that would otherwise result in the formation of scale or similar deposits. Thus, substances such as paraffin, asphaltene, silica or calcium tend to become non-adhesive and typically remain suspended within a fluid column.

In many instances, the induced polarization of substances suspended within a fluid column and flowing through a piping system may result in the re-polarization of elements that have previously settled and formed scale deposits. Re-polarization of existing scale and other deposits allows such substances to be suspended within a magnetically treated fluid column, thereby restoring flow through the piping system and improving the efficiency of its transmission equipment. Where chemical treatment has previously been used for scale prevention, electromagnet treatment may result in a substantial reduction, or the total elimination, of chemical additives to the system.

Magnetic treatment may also be used to accelerate the separation of oil and water. Environmental regulations require entities generating contaminated fluid columns as part of a manufacturing process or the result of an incidental spill or leak with the containment, treatment and elimination of pollutants from a fluid column prior to discharging a treated effluent into the environment. The instant invention has proven to boost the efficiency of oil/water separation equipment by influencing forces creating oil/water mixtures and breaking many oil/water emulsions. This allows suspended or emulsified hydrocarbons, such as oil, to precipitate and then be extracted from a hydrocarbon-contaminated feed stream as it passes through an oil/water separation device. Other contaminants, such as suspended solids, may remain within a fluid column and may then be extracted from a feedstock by simple filtration apparatus. If a fluid column requires additional remedial action prior to its release into the environment, the feed stream may be further treated to provide an effluent suitable for discharge.

Many prior art devices utilize a conduit comprising a non-magnetically conductive material, such as a length of plastic pipe, surrounded by a coil of wire to generate a magnetic field or use a magnetically conductive material, such as carbon steel, to form a protective housing for the coil of wire. Such devices are capable of providing magnetic treatment in only one area, within the energized coil of wire. In contrast, the instant invention provides magnetic fluid treatment at a plurality of distinct points. When properly configured and arranged within a piping system utilizing apposite piping system components, the instant invention has the capacity to provide magnetic treatment to a fluid column not only within the coiled electrical conductor encircling the conduit, but at each end of the magnetically energized conduit as well.

The instant invention utilizes a length of magnetically conductive conduit, a plurality of non-magnetic coupling devices and an energized coil of an electrical conductor to provide magnetic fluid treatment at a plurality of distinct points. As used herein, an electromagnetic field generator having a capacity to provide magnetic treatment of a fluid column at a plurality of distinct points is defined as a length of conduit comprising a magnetically conductive material with a first and a second coupling device comprising a non-magnetically conductive material connected to each end of the conduit and an electrical conductor coiled around a segment of said conduit to form a continuous wire coil, said electrical conductor being connected to an electrical power supply having a capacity to energize the coiled electrical conductor and produce an electromagnetic field.

The magnetically conductive conduit is a magnetically conductive material defining a fluid impervious boundary wall with an inner surface and an outer surface and having a fluid entry port at one end and a fluid discharge port at the other end. Each non-magnetic coupling device establishes a non-magnetically conductive conduit segment comprising a nonmagnetic material defining a fluid impervious boundary wall with an inner surface and an outer surface and having inlet and outlet ports, the inner surface of said inlet and outlet ports adapted to receive a segment of conduit. The first non-magnetically conductive inlet conduit segment, in fluid communication with the inlet port of the magnetically conductive conduit, and the second non-magnetically conductive inlet conduit segment, in fluid communication with the outlet port of the magnetically conductive conduit, make fluid impervious, non-contiguous connections between the magnetically conductive conduit and other segments of conduit to promote the flow of fluid through the energized conduit.

Encircling a segment of the magnetically conductive conduit with an electrical conductor forms the continuous wire coil, said electrical conductor comprising a continuous strand of an electrical conducting material having a first conductor lead and a second conductor lead. Each turn of the continuous strand of electrical conductor may be contiguous with the adjacent turn of electrical conductor to form an uninterrupted layer of the coiled electrical conductor. While an uninterrupted layer of coiled wire is preferred, mechanical winding of an electrical conducting material may result in small gaps or openings between adjacent turns of the continuous wire coil.

Such gaps serve no beneficial purpose and may in fact result in hot spots within the continuous coil of wire and impede its performance. An uninterrupted layer of a continuously coiled electrical conducting material, with each turn of the electrical conducting material being contiguous with its adjacent turn, provide the most efficient means of generating the electromagnetic field of the instant invention. Additional layers of the continuous wire coil may be added to achieve the desired configuration of a device.

To generate an electromagnetic field, a first conductor lead of the continuous coil of wire may be connected to a first terminal of an electrical power supply and a second conductor lead of the continuous wire coil may be connected to a second terminal of the power supply, the electrical power supply having the capacity to energize the coiled electrical conductor and produce an electromagnetic field within the inner surface of the fluid impervious boundary wall of the conduit. When voltage is supplied to the continuous coil of wire, the amp-turns of the energized coil provide a magnetic field that is absorbed by the magnetically conductive conduit. The magnetic flux loop generated by the energized wire encircling the conduit flows from one end of the wire coil, around the periphery of the wire coil along the longitudinal axis of the conduit and to the other end of the continuous wire coil. In the instant invention, the strength of the magnetic field is of sufficient magnitude to induce magnetic treatment to a fluid passing through the magnetically energized conduit and provide a magnetic flux loop extending beyond each end of the conduit. The flow of the magnetic flux loop typically extends from a point where the flux loop consolidates beyond one end of the magnetically energized conduit, around the periphery of the continuous coil of wire along the longitudinal axis of the conduit and to a point where the flux loop reconsolidates beyond the other end of the magnetically energized conduit.

The magnetic field and the magnetic flux loop are concentrated at three distinct points; the inlet port at one end of the magnetically energized conduit, the center of the wire coil and the outlet port at the other end of the conduit These distinct points of concentrated magnetic energy are typically of sufficient strength to provide effective magnetic treatment of a fluid passing through the magnetically energized conduit. In contrast, the magnetic flux loop generated by prior art devices utilizing non-magnetically conductive conduits, such as plastic pipe, cannot be absorbed by the conduit. Absent the absorption of the magnetic field by the conduit, magnetic fluid treatment cannot be provided to a fluid passing through the inlet and outlet ports of a non-magnetically conductive conduit and is therefore limited to the area within the coil of wire.

Prior art devices utilizing a magnetically conductive conduit encircled by an energized coil of wire typically utilize coupling devices and segments of conduit comprising a similar magnetically conductive material to promote the flow of fluid through their devices. In a continuous configuration of magnetically conductive components, the magnetic field generated by an energized coil of electrical conductor is absorbed by the contiguous arrangement of magnetically conductive conduits and magnetically conductive coupling devices in fluid communication with one another. Thus, the magnetic energy that may otherwise concentrate at each end of a magnetically energized conduit is absorbed by the contiguous magnetically conductive components and is no longer of sufficient strength to provide magnetic fluid treatment at a plurality of distinct points. Therefore, a piping system utilizing magnetically conductive components connected in fluid communication with one another limits magnetic fluid treatment to the single area within the energized coil of electrical conductor.

Other prior art devices utilize a plurality of distinct clusters of coiled wire to encircle a single length of magnetically conductive conduit. As the magnetically conductive conduit absorbs the magnetic field generated by each distinct cluster of coiled wire, the magnetic energy tends to concentrate in a single area near the center of the clustered coils. Thus, a plurality of distinct coils of wire encircling on a length of magnetically conductive conduit fails to provide magnetic treatment at a plurality of distinct points as the conduit absorbs the magnetic fields and concentrates them in a single area.

In the instant invention, the strength of the magnetic field is sufficient to provide a magnetic flux loop extending beyond each end of the magnetically energized conduit. The flow of the magnetic flux loop typically extends from a point where the flux loop consolidates beyond one end of the magnetically energized conduit, around the periphery of the continuous coil of wire along the longitudinal axis of the conduit and to a point where the flux loop reconsolidates beyond the other end of the magnetically energized conduit. When included in a piping system, magnetic fluid treatment is provided at a plurality of distinct points by utilizing non-magnetic coupling devices to make fluid impervious, non-contiguous connections of the inlet and outlet ports of a magnetically energized conduit with additional segments of conduit utilized to promote the flow of fluid through the magnetically energized conduit.

The non-magnetic coupling devices establish the flow of a fluid along a path extending through a first non-magnetically conductive inlet conduit segment, a magnetically energized conduit downstream of the inlet segment and a second non-magnetically conductive outlet conduit segment downstream of the magnetically conductive conduit segment. Nonmagnetic material allows the magnetic flux loop of the magnetically energized conduit to pass through the fluid impervious boundary wall of the coupling devices and concentrate near the ends of the magnetically energized conduit so that fluid flowing through the non-magnetically conductive conduit segments may receive magnetic treatment in these regions.

For example, a feed stream comprising a fluid column receptive to magnetic treatment may be introduced to the inlet port of a first non-magnetic coupling device connected to a magnetically energized conduit to establish the flow of fluid through the apparatus. As the feed stream flows through the first non-magnetically conductive conduit segment, in fluid communication with the inlet port of the magnetically energized conduit, it may be exposed to approximately 150 gauss of magnetic flux concentrated in this first region of magnetic treatment. After being discharged from the inlet port of the conduit, the fluid column may then be exposed to 200 gauss of magnetic energy concentrated in a second region of magnetic treatment as it is directed to pass through the energized coil along a path extending through and substantially orthogonal to each turn of the electrical conductor forming the coil of wire surrounding the outer surface of the conduit. As the feed stream is directed to flow through a second non-magnetically conductive conduit segment, in fluid communication with the outlet port of the magnetically energized conduit, it is then exposed to approximately 150 gauss of magnetic flux concentrated in this third region of magnetic treatment. The fluid column may then be discharged from the second non-magnetic coupling device as a processed feed stream.

Thus, fluid passing through an electromagnetic field generator utilizing nonmagnetic coupling devices serving as non-magnetically conductive inlet and outlet conduit segments making fluid impervious, non-contiguous connections between the inlet and outlet ports of a magnetically energized conduit and additional segments of conduit to promote the flow of fluid through the magnetically energized conduit may receive magnetic treatment at a plurality of distinct points.

Because the magnetically conductive conduit absorbs the magnetic field generated by the energized coil of wire encircling it, other magnetically conductive objects will typically be attracted to it. Further, as the gap between a magnetically energized conduit and another magnetically conductive object decreases, the strength of the magnetic field in the space between the energized conduit and the other object typically increases due to the magnetic energy being concentrated in a smaller area.

Utilizing a non-magnetic coupling device to make a non-contiguous connection between a magnetically energized conduit and an additional segment of magnetically conductive conduit allows the strength of the magnetic field concentrated at the end of the energized conduit to increase due to the attraction of the non-energized conduit to the energized conduit. Further, as the distance between the ends of the conduits decreases, the strength of the magnetic field in the space between the ends of the two conduits typically increases as the magnetic energy is concentrated in a smaller area.

For example, a feed stream passing through a first non-magnetic coupling device making a fluid impervious, non-contiguous connection between a first length of non-energized magnetically conductive conduit and a magnetically energized conduit may be exposed to approximately 300 gauss of magnetic energy concentrated in this first region of magnetic treatment. The fluid column may then be exposed to 200 gauss of magnetic flux in a second region of magnetic treatment as it is directed to pass through the energized coil along a path extending through and substantially orthogonal to each turn of the electrical conductor forming the coil of wire surrounding the outer surface of the magnetically energized conduit. The feedstock may then be exposed to approximately 300 gauss of magnetic flux in a third region of magnetic treatment as it passes through the magnetic field concentrated in the fluid impervious, non-contiguous connection between the magnetically energized conduit and a second length of non-energized magnetically conductive conduit provided by a second non-magnetic coupling device.

Thus, the non-contiguous connections of a magnetically energized conduit with two flanking lengths of non-energized magnetically conductive conduit may result in the magnetic flux concentrated at each end of the magnetically energized conduit increasing from 150 gauss to 300 gauss. However, if the end of a magnetically energized conduit is allowed to come in contact with a flanking length of magnetically conductive conduit, the magnetic flux loop to be absorbed by the contiguous configuration of magnetically conductive conduits and magnetic energy will no longer be concentrated at the end of the magnetically energized conduit. Thus, 200 gauss of magnetic fluid treatment may be attained as a feed stream passes through the magnetic energy concentrated within the energized coil of wire, but no magnetic fluid treatment will be provided at the end of the energized conduit in fluid communication with a flanking length segment of non-energized magnetically conductive conduit.

Some prior art devices insert baffling devices or core means within the bore of the conduit used to transport a fluid through a magnetic field in an attempt to convolute the flow of a fluid or otherwise effect the treatment provided by the device. However, the insertion of baffles, core means or other apparatus within the internal boundary wall of the magnetically conductive conduit of the instant invention typically restricts the flow of fluid through the conduit and provides no benefit to the magnetic fluid treatment provided by the device. The backflow and eddies that normally occur as a fluid column passes through a conduit result in sufficient turbulence for effective magnetic fluid treatment. Therefore, the instant invention does not include any type of baffle within the magnetically conductive conduit or core means disposed within and spaced apart from the internal boundary wall of the magnetically energized conduit. This allows the full flow capacity of the device to be realized.

While the amp-turns of an electromagnetic field generator typically indicate the gauss strength of a device, a method of attaining a significant increase in gauss strength generated by an identical number of amp-turns has been discovered. This is done by dividing the length of magnetically conductive conduit of the previously disclosed device into two shorter, equal lengths of conduit and similarly dividing the length of electrical conductor of the previously disclosed device into two smaller, equal lengths. The first smaller length of electrical conductor may be wound around the first shorter length of conduit to form a first coil of wire encircling the first conduit and the second smaller length of electrical conductor may be wound around the second shorter length of conduit to form a second coil of wire encircling the second conduit. A non-magnetic coupling device may be used to make a fluid impervious, noncontiguous connection between these two shorter lengths of conduit encircled by wire coils.

The second conductor lead of the first coil of wire encircling the first conduit is connected to the adjacent first conductor lead of the second coil of wire encircling the second conduit. The now continuous coil of wire surrounding the non-contiguously connected conduits may be energized with a single power supply. The combined amp-turns of the two shorter magnetically energized conduits are identical to the number of amp-turns of the original larger unit. However, the strength of the magnetic field within either of the two smaller coils is typically less than half the strength of the magnetic field within the larger coil. This is due to the amp-turns of the larger device being concentrated in only one area while the amp-turns of the two smaller units are concentrated in two separate and distinct areas.

The distinct magnetic fields generated by each of the two smaller units are concentrated in the space between the magnetically energized conduits. The magnetic energy concentrated in the space between the non-contiguously connected, magnetically energized conduits is typically more than six times that found within the coiled electrical conductor of the larger unit. This enhanced point of magnetic fluid treatment is the result of the attraction of the non-contiguous, magnetically energized conduits to one another and the concentration of their distinct magnetic fields one distinct area.

The previously disclosed use of a non-magnetic coupling device to connect a magnetically energized conduit and a non-energized magnetically conductive conduit has been shown to boost the strength of magnetic energy concentrated at the end of the energized conduit to 150% of the strength of the magnetic field concentrated within its coil of wire. However, the non-contiguous connection of the two shorter magnetically energized conduits provides an even greater increase of magnetic energy. The fluid impervious, non-contiguous connection of two magnetically energized conduits via a non-magnetic coupling device may result in the magnetic energy concentrated in the space between the conduits being more than 1500% of the strength of the magnetic field within either of the two smaller energized coils. Further, non-magnetic coupling devices may be utilized to provide fluid impervious, non-contiguous connections at the inlet port of the first magnetically energized conduit and outlet port of the second magnetically energized conduit to provide additional distinct points of magnetic fluid treatment.

For example, a fluid flowing through two magnetically energized conduits connected via a non-magnetic coupling device may be exposed to approximately 120 gauss of magnetic energy as it passes through the inlet port of the first conduit. The fluid column may then be exposed to 80 gauss of magnetic flux as it is directed to pass through the first energized coil along a path extending through and substantially orthogonal to each turn of the first electrical conductor forming the first coil of wire surrounding the outer surface of the first conduit. As the fluid passes through the non-magnetic coupling device connecting the outlet port of the first magnetically energized conduit and the inlet port of the second magnetically energized conduit, it may be exposed to more than 1200 gauss of magnetic energy concentrated in the space between the two magnetically energized conduits. As the fluid flows through the second magnetically energized conduit, it may then be exposed to 80 gauss of magnetic flux as it is directed to pass through the second energized coil along a path extending through and substantially orthogonal to each turn of the second electrical conductor forming the second coil of wire surrounding the outer surface of the second conduit. The fluid column may finally be exposed to approximately 120 gauss of magnetic energy as passes through the outlet port of the second conduit.

However, if the ends of two magnetically energized conduits are allowed to come in contact with each other, their magnetic energy will concentrate in a single area, similar to a single area of concentrated magnetic energy provided by several distinct clusters of coiled electrical conductor encircling a length of magnetically conductive conduit. The direct contact of energized conduits results the magnetic energy generated by the distinct coils of energized wire being absorbed by the now contiguous magnetically conductive conduits and concentrated in a single area. Therefore, the adjacent ends of two magnetically energized conduits must be in a non-contiguous connection to allow their distinct magnetic fields to concentrate in the space between them. Absent the claimed fluid impervious, non-contiguous connection between the magnetically energized conduits, a distinct point of enhanced magnetic fluid treatment in the space between the conduits is not present.

A number of variables may be modified to optimize the instant invention. For example, the size and shape of the wire used to form the wire coil, the length of the winding along the surface of the conduit and the number of layers of wire forming the coil of wire may be adapted to specific applications to optimize the device. These factors, along with the output capacity of the power supply determine the total amp-turns of the device. Other variables include the size, shape and types of materials comprising the conduit and coupling devices, and the size, shape and composition of materials comprising a protective housing, if included.

The instant invention may be modified to provide magnetic treatment to fluids containing corrosive, caustic or other types of components that could damage the fluid impervious boundary wall of the magnetically conductive conduit or otherwise affect the structural integrity of the device. Tubular conduits comprising materials such as polyethylene, polypropylene, polyurethane, nylon or plasticized polyvinyl chloride typically have a resistance to many fluids that may damage the magnetically conductive conduit. Such fluids may receive exposure to magnetic energy at a plurality of distinct points by adapting the instant invention to sleeve a segment of non-magnetically conductive pipe, hose or other form of tubular conduit within the aperture of the magnetically energized conduit.

The instant invention may be installed on a segment of conduit within a piping system comprising a non-magnetically conductive material utilized in the transmission of a fluid column. The diameter of the inner surface of the fluid impervious boundary wall of the magnetically conductive conduit must greater than the external diameter of the fluid impervious boundary wall of the non-magnetically conductive conduit so the magnetically energized conduit may sleeve a segment of the non-magnetic conduit.

When the flow of fluid through a non-magnetically conductive piping system must not be interrupted, the magnetically conductive conduit may be split along its longitudinal axis into sections of preferably equal size. These sections may then be rejoined adjacent the outer surface of the fluid impervious boundary wall of the non-magnetic conduit so that the magnetically conductive conduit encircles a segment of the non-magnetic piping system. Non-magnetically conductive conduit segments may be connected to the ends of the magnetically conductive conduit so that they encircle a segment of the non-magnetic piping system. The electrical conductor may then be coiled around the outer surface of the magnetically conductive conduit and energized by a power supply. The resulting sleeve comprising a magnetically energized conduit encircling the non-magnetic conduit provides for magnetic fluid treatment at a plurality of distinct points.

Because the internal conduit transporting the fluid through the piping system is non-magnetic, the magnetic flux generated by the magnetically energized conduit is not captured or absorbed by it. The magnetic energy of the flux loop is therefore free to flow through the non-magnetically conductive conduit as if through air and may concentrate within the fluid transmission conduit at distinct points relative to the coiled electrical conductor and each end of the magnetically energized conduit.

Installation of the instant invention in a large diameter piping system may require the use of flanged connections at the inlet and outlet ports of the magnetically energized conduit. In such applications, a gasket comprising a non-magnetically conducting material may be utilized to seal a flanged connection between the end of a magnetically energized conduit and the end of another segment of conduit. When utilized in this manner, a gasket comprising a non-magnetically conducting material provides a coupling device establishing a non-magnetically conductive conduit segment defining a fluid impervious boundary wall with an inner surface and an outer surface and having inlet and outlet ports, the inner surface of said inlet and outlet ports adapted to receive a segment of conduit. The use of a non-magnetic gasket allows the magnetic flux loop to pass through its fluid impervious boundary wall and concentrate near the end of the magnetically energized conduit so that fluid within this non-magnetically conductive conduit segment may receive magnetic treatment.

Cuts, abrasions, dents, exposure to sunlight and other types of damage may affect the structural integrity of the coiled electrical conductor and impair its performance. An enclosure may be used to protect the wire coil. It may be solid-bodied or may include a pattern of perforations that allow for ventilation of the unit.

Prior art devices typically utilize a protective housing formed with materials having a high magnetic permeability to protect the coil of wire. The enclosures are typically formed by attaching a pair of end plates to the conduit on either side of the coil of wire. The end plates typically comprise a magnetically conductive material similar to that comprising the conduit, with one end plate located between the inlet port of the conduit and the coil of wire and the other end plate located between the coil of wire and the outlet port of the conduit. The coil of wire is then enclosed within a protective housing by attaching a tubular member, comprising a similar magnetically conductive material, to the pair of magnetically conductive end plates affixed to conduit.

The use of a magnetically conductive material, such as carbon steel, to form a protective housing provides a flow path for the magnetic flux loop generated by the coil of wire and prevents stray magnetic fields outside of the housing. This typically results in the magnetic flux loop generated by an energized coil of wire being captured within the magnetically conductive housing so that little, if any, gauss strength can be measured at either end of a magnetically energized conduit. Thus, magnetic fluid treatment is limited to the area within the energized coil of wire. For example, a fluid flowing through a magnetically energized conduit enclosed within a housing comprising a magnetically permeable material may only be exposed to 200 gauss of magnetic treatment as it passes through the coil of wire.

Therefore, in order to achieve magnetic fluid treatment at a plurality of distinct points it is advantageous to utilize a non-corrosive material having a high coefficient of thermal conductivity and low magnetic permeability, such as aluminum or stainless steel, to form the protective enclosure for the coil of wire. Non-magnetic coupling devices may be used to connect a magnetically energized conduit enclosed with a non-magnetic housing to a piping system to promote the flow of fluid through the energized conduit. The non-magnetic components prevent the magnetic flux loop from being captured, absorbed or contained within the housing or the couplings so that it is therefore free to flow as if through air.

For example, fluid may flow through a magnetically energized conduit, enclosed within a non-magnetic protective housing, utilizing non-magnetic coupling devices to provide fluid impervious, non-contiguous connections at each end of the conduit to promote the flow of a feed stream through the energized conduit. The fluid may be exposed to 150 gauss of magnetic flux as passes through the inlet port of the energized conduit and then 200 gauss of magnetic energy as it passes through the coil of wire encircling it. Additionally, the fluid may be exposed to 150 gauss of magnetic flux as it passes through the outlet port of the energized conduit. Thus, magnetic fluid treatment may be provided at a plurality of distinct points by a magnetically energized conduit enclosed within a non-magnetic housing. In comparison, magnetic fluid treatment is only provided within the coil of wire of a similar energized conduit enclosed within a magnetically permeable housing.

In certain applications, it may be desirable to contain the magnetic flux loop of the energized coil of wire to prevent it from flowing through the air surrounding the device. Magnetic fluid treatment may be provided at a plurality of distinct points by utilizing a protective housing comprising a magnetically conductive material that extends beyond each end of a magnetically energized conduit. In this configuration, non-magnetic coupling devices are utilized within a magnetically conductive enclosure to make fluid impervious, non-contiguous connections between the energized conduit and a pair of flanking lengths of non-energized magnetically conductive conduit.

A first end plate may be affixed to a first flanking length of non-energized magnetically conductive conduit making a fluid impervious, non-contiguous connection at the inlet port of the magnetically energized conduit and a second end plate may be affixed to a second flanking length of non-energized magnetically conductive conduit making a fluid impervious, non-contiguous connection at the outlet port of the magnetically energized conduit. The coil of wire may then be enclosed within a protective housing by attaching a tubular member to the end plates affixed to the flanking lengths of conduit. The end plates and the tubular member forming the protective housing typically comprise a magnetically conductive material similar to that comprising the flanking lengths of magnetically conductive conduit. The use of a magnetically conductive protective housing provides a path for flow of the magnetic flux loop generated by the energized electrical conductor and captures it within the housing. Non-magnetic coupling devices are used within the magnetically conductive housing to connect the magnetically energized conduit with the flanking lengths of conduit to promote the flow of fluid through the energized conduit. The non-contiguous connections provided by the non-magnetic couplings prevent the magnetic flux loop from being absorbed by a contiguous arrangement of magnetically conductive conduits and allow the magnetic energy generated by the energized coil of wire to concentrate in the spaces between the energized conduit and the flanking segments of magnetically conductive conduit.

For example, fluid may flow through a magnetically energized conduit utilizing non-magnetic coupling devices to provide fluid impervious, non-contiguous connections with flanking lengths of magnetically conductive conduit to promote the flow of a feed stream through the energized conduit. The magnetically energized conduit and the non-magnetically conductive conduit segments may be enclosed within a magnetically conductive housing having its end plates affixed to the flanking lengths of conduit. The fluid may be exposed to 150 gauss of magnetic flux as it passes through the inlet port of the magnetically energized conduit, then 200 gauss of magnetic energy as it passes through the coil of wire encircling the conduit and 150 gauss of magnetic flux as it passes through the outlet port of the energized conduit. Thus, magnetic fluid treatment may be provided within a magnetically conductive housing at a plurality of distinct points by utilizing non-magnetic coupling devices to make fluid impervious, noncontiguous connections at the inlet and outlet ports of the magnetically energized conduit.

The instant invention may be adapted to specific installation configurations and provide magnetic fluid treatment at a plurality of distinct points. For example, the instant invention may be located at the end of a piping system where treated fluid may be discharged directly into the environment from the fluid discharge port of the magnetically conductive conduit as a processed feed stream. In this application, the previously disclosed second nonmagnetic coupling device connected to the outlet port of the magnetically conductive may not be required to provide magnetic fluid treatment at a plurality of distinct points. This embodiment of the instant invention comprises a length of conduit, said conduit comprising a magnetically conductive material defining a fluid impervious boundary wall with an inner surface and an outer surface and having a fluid entry port at one end of the conduit and a fluid discharge port at the other end of the conduit, further comprising a fluid flow conduit promoting the flow of a fluid through the magnetically conductive conduit, said fluid flow conduit defining a fluid impervious boundary wall with an inner surface and an outer surface. An electrical conductor comprising at least one strand of an electrical conducting material having a first conductor lead and a second conductor lead may be coiled around the outer surface of the magnetically conductive conduit to form at least one layer of electrical conductor encircling the magnetically conductive conduit. The conductor leads may then be connected to an electrical power supply having a capacity to energize the electrical conductor and provide magnetic fluid treatment at a plurality of distinct points.

A feed stream comprising a fluid column receptive to magnetic treatment introduced to the inner surface of the fluid impervious boundary wall of the fluid flow conduit establishes a flow of the fluid through the magnetically conductive conduit. The flow of fluid entering the magnetically conductive conduit may then be directed to pass through a first area of magnetic treatment concentrated at the fluid entry port of the magnetically conductive conduit. The flow discharged from the fluid entry port of the magnetically conductive conduit may then be directed to pass through a second area of magnetic treatment concentrated along a path extending through and substantially orthogonal to each turn of the electrical conductor encircling the outer surface of the magnetically conductive conduit, then directed to pass through a third area of magnetic treatment concentrated at the fluid discharge port of the magnetically conductive conduit. The fluid may then be discharged from the fluid discharge port of the magnetically conductive conduit as a processed feed stream.

The fluid flow conduit promoting the flow of the fluid through the magnetically conductive conduit may take several forms. In a first example, a coupling segment comprising a non-magnetically conductive material defining a fluid impervious boundary wall with an inner surface and an outer surface and having inlet and outlet ports, said inlet and outlet ports adapted to receive a segment of conduit, may provide for the fluid impervious, non-contiguous connection of the magnetically conductive conduit with an additional segment of conduit. A second example may be a length of non-magnetically conductive conduit, said length of non-magnetically conductive conduit defining a fluid impervious boundary wall with an inner surface and an outer surface and having a fluid flow port adapted to receive an end of the magnetically conductive conduit, said fluid flow port providing for the fluid impervious connection of the length of non-magnetically conductive conduit with the magnetically conductive conduit.

A third example of a fluid flow conduit may be a section of conduit arranged in non-contiguous relation with the magnetically conductive conduit, said section of conduit defining a fluid impervious boundary wall with an inner surface and an outer surface and having a fluid discharge port adapted to direct fluid into the inlet port of the magnetically conductive conduit, the space between said discharge port of the fluid flow conduit and said inlet port of the magnetically conductive conduit establishing a non-magnetically conductive region between the conduits. A fourth example of a fluid flow conduit promoting the flow of the fluid through the magnetically conductive conduit may be a section of conduit within a piping system comprising a non-magnetically conductive material sleeved by the magnetically conductive conduit, said section of non-magnetically conductive conduit defining a fluid impervious boundary wall with an inner surface and an outer surface. The fluid flow conduit promotes the flow of fluid through the magnetically conductive conduit.

The length of magnetically conductive conduit comprising a fluid impervious boundary wall with an inner surface and an outer surface and having a fluid entry port at one end of the conduit and a fluid discharge port at the other end of the conduit may be encircled by an electrical conductor coiled around the outer surface of a segment of said magnetically conductive conduit to form at least one layer of electrical conductor encircling the magnetically conductive conduit, said electrical conductor comprising at least one strand of electrical conducting material having a first conductor lead and a second conductor lead. At least one electrical power supply having a capacity to energize the coiled electrical conductor produces an electromagnetic field within the inner surface of the fluid impervious boundary wall of the magnetically conductive conduit, said magnetic field extending beyond each end of the magnetically conductive conduit along the longitudinal axis of the magnetically energized conduit.

A protective coating may be applied to the inner surface or outer surface of the fluid impervious boundary wall of the magnetically conductive conduit. In some instances, an end of the fluid impervious boundary wall of the magnetically conductive conduit may be tapered. Tapering an end of the fluid impervious boundary wall of a magnetically conductive conduit typically facilitates its connection to the fluid flow conduit and may result in a greater concentration of magnetic energy at that end of the conduit compare to the opposite end having relatively square fluid impervious boundary wall.

A non-magnetic stabilizer may be disposed between the outer surface of the fluid impervious boundary wall of the magnetically conductive conduit and the coiled electrical conductor to maintain the alignment of the coiled electrical conductor. Further, a non-magnetic stabilizer may envelope the coiled electrical conductor to maintain the alignment of the coil and form a protective sleeve for the layer of coiled electrical conductor.

The electrical conductor may comprise a single strand of electrical conducting material forming a single coil layer or coiled around the magnetically conductive conduit to form a first coil layer encircling the magnetically conductive conduit and a second coil layer encircling the magnetically conductive conduit, said first and second coil layers being coaxially disposed. The electrical conductor may also comprise a first strand of electrical conducting material forming the first coil layer and a second strand of electrical conducting material forming the second coil layer.

In instances where the electrical conductor forms a first coil layer encircling the magnetically conductive conduit and a second coil layer encircling the magnetically conductive conduit, a non-magnetic stabilizer may be disposed between the first and second coil layers to maintain the alignment of the coaxially disposed coil layers. In instances where two strands of electrical conducting material form the coil layers, the first and second conductor leads of the first and second strands of electrical conducting material may be connected in series to a supply of electrical power, connected in parallel to a supply of electrical power or the first and second conductor leads of the first strand of electrical conducting material may be connected to a first supply of electrical power and the first and second conductor leads of the second strand of electrical conducting material may be connected to a second supply of electrical power. In instances where the electrical conductor forms a first coil layer encircling the magnetically conductive conduit and a second coil layer encircling the magnetically conductive conduit, a nonmagnetic stabilizer may be disposed between the first and second coil layers to maintain the alignment of the coaxially disposed coil layers.

A magnetically conductive conduit encircled by a first coil layer and a second coil layer having a non-magnetic stabilizer disposed between the first and second coil layers to maintain the alignment of the coaxially disposed coil layers may be enclosed within a protective housing comprising a tubular member having a pair of end plates affixed to the magnetically conductive conduit. The protective housing may comprise a non-magnetically conductive material or the end plates of the protective housing may comprise a non-magnetically conductive material and the tubular member of the protective housing may comprise a magnetically conductive material.

Several embodiments of a fluid flow conduit may be utilized to promote the flow of the fluid through the magnetically conductive conduit. In a first example, a coupling segment comprising a non-magnetically conductive material may establish the fluid flow conduit promoting the flow of the fluid through the magnetically conductive conduit, said non-magnetically conductive coupling segment defining a fluid impervious boundary wall with an inner surface and an outer surface and having inlet and outlet ports, said inlet and outlet ports adapted to receive a segment of conduit and provide for the fluid impervious, non-contiguous connection of the magnetically conductive conduit with an additional segment of conduit. The non-contiguous connection of the magnetically conductive conduit with an additional conduit segment establishes a non-magnetically conductive region between the magnetically conductive conduit and the additional segment of conduit. Further, the non-contiguous connection of the magnetically energized conduit with an additional segment of magnetically conductive conduit provides for a concentration of magnetic energy in the non-magnetically conductive region between the magnetically conductive conduits.

When first and second coupling segments comprising a non-magnetically conductive material are utilized to promote the flow of the fluid through the magnetically conductive conduit, a protective housing may be included to enclose the fluid entry port, the coiled electrical conductor and the fluid discharge port. The protective housing may comprise a tubular member having a first end plate affixed to a first non-magnetically conductive coupling segment and a second end plate affixed to a second non-magnetically conductive coupling segment and made of a magnetically conductive material or a non-magnetically conductive material. In certain instances, the first and second end plates of the protective housing may comprise a non-magnetically conductive material and the tubular member of the protective housing may comprise a magnetically conductive material or the first and second end plates of the protective housing may comprise a magnetically conductive material and the tubular member of the protective housing may comprise a non-magnetically conductive material.

A second example of a fluid flow conduit utilized to promote the flow of the fluid through the magnetically conductive conduit comprises a length of non-magnetically conductive conduit establishing the fluid flow conduit promoting the flow of the fluid through the magnetically conductive conduit, said length of non-magnetically conductive conduit defining a fluid impervious boundary wall with an inner surface and an outer surface and having a fluid flow port adapted to receive an end of the magnetically conductive conduit, said fluid flow port providing for the fluid impervious connection of the length of non-magnetically conductive conduit with the magnetically conductive conduit. The fluid impervious connection of a length of non-magnetically conductive conduit with an end of the magnetically conductive conduit establishes an area of magnetic treatment concentrated at that end of the magnetically energized conduit.

In applications where a first length of non-magnetically conductive conduit connected to the fluid entry port at one end of the magnetically conductive conduit establishes a non-magnetically conductive inlet conduit segment and a second length of non-magnetically conductive conduit connected to the fluid discharge port at the other end of the magnetically conductive conduit establishes a non-magnetically conductive outlet conduit segment, a protective housing may be utilized to enclose the magnetically conductive conduit. The protective housing may comprise a tubular member having a first end plate affixed to the non-magnetically conductive inlet conduit segment and a second end plate affixed to the non-magnetically conductive outlet conduit segment and may be made of a magnetically conductive material or a non-magnetically conductive material.

Further, the first and second end plates of the protective housing may comprise a non-magnetically conductive material and the tubular member of the protective housing may comprise a magnetically conductive material or the first and second end plates of the protective housing may comprise a magnetically conductive material and the tubular member of the protective housing may comprise a non-magnetically conductive material.

A third embodiment of a fluid flow conduit utilized to promote the flow of the fluid through the magnetically conductive conduit comprises a section of conduit arranged in non-contiguous relation with the magnetically conductive conduit establishing the fluid flow conduit promoting the flow of the fluid through the magnetically conductive conduit, said section of conduit defining a fluid impervious boundary wall with an inner surface and an outer surface and having a fluid discharge port adapted to direct fluid into the inlet port of the magnetically conductive conduit, the space between said discharge port of the fluid flow conduit and said inlet port of the magnetically conductive conduit establishing a non-magnetically conductive region between the conduits. The fluid flow conduit may comprise a non-magnetically conductive material or a magnetically conductive material. The non-contiguous arrangement of the magnetically energized conduit with a magnetically conductive fluid flow conduit provides for a concentration of magnetic energy in the non-magnetically conductive region between the magnetically conductive conduits.

A fourth embodiment of a fluid flow conduit utilized to promote the flow of the fluid through the magnetically conductive conduit comprises a section of conduit within a piping system comprising a non-magnetically conductive material sleeved by the magnetically conductive conduit establishing the fluid flow conduit promoting the flow of the fluid through the magnetically conductive conduit, said section of non-magnetically conductive conduit defining a fluid impervious boundary wall with an inner surface and an outer surface.

A protective housing comprising a tubular member having a first end plate affixed to the section of non-magnetically conductive fluid flow conduit proximate and spaced apart from the fluid entry port at one end of the magnetically conductive conduit and a second end plate affixed to the section of non-magnetically conductive fluid flow conduit proximate and spaced apart from the fluid discharge port at the other end of the magnetically conductive conduit may be utilized to enclose the magnetically conductive conduit.

The protective housing may comprise a magnetically conductive material or a non-magnetically conductive material, the first and second end plates of the protective housing may comprise a non-magnetically conductive material and the tubular member of the protective housing may comprise a magnetically conductive material or the first and second end plates of the protective housing may comprise a magnetically conductive material and the tubular member of the protective housing may comprise a non-magnetically conductive material.

In applications where the flow of fluid through the non-magnetically conductive fluid flow conduit cannot be interrupted for an in-line installation of the instant invention, the magnetically conductive conduit may be split along its longitudinal axis into preferably equal sections then rejoined proximate the outer surface of the fluid impervious boundary wall of the non-magnetically conductive fluid flow conduit to establish a section of the non-magnetically conductive conduit within the piping system sleeved by the magnetically conductive conduit. In a similar installation, the magnetically conductive conduit may comprise a sheet of magnetically conductive material rolled in concentric surrounding relation around the outer surface of the fluid impervious boundary wall of the non-magnetically conductive conduit to establish a section of non-magnetically conductive conduit within the piping system sleeved by the magnetically conductive conduit. In each instance, the electrical conductor may then be coiled around the outer surface of the magnetically conductive conduit and energized by a supply of electrical power to allow the magnetically energized conduit sleeving the non-magnetically conductive conduit to provide magnetic fluid treatment at a plurality of distinct points.

Improved magnetic fluid treatment may be attained by sleeving the non-magnetically conductive fluid flow conduit with a non-contiguous array of a first magnetically conductive conduit and a second magnetically conductive conduit, the space between said first and second magnetically conductive conduits establishing a non-magnetically conductive region between the magnetically conductive conduits. This non-contiguous array of magnetically conductive conduits provides for a concentration of magnetic energy in the non-magnetically conductive region between the magnetically conductive conduits. A spacer may be utilized to maintain the non-magnetically conductive region between the magnetically conductive conduits, said spacer comprising a non-magnetically conductive material disposed proximate the outer surface of the fluid impervious boundary wall of the non-magnetically conductive conduit between the magnetically conductive conduits. At least one strand of electrical conducting material may be utilized to form at least one coil layer of electrical conductor encircling at least a section of the outer surface of the magnetically conductive conduits.

Thus, a method of fluid treatment at a plurality of distinct points may be provided by establishing a flow of the fluid to be treated along a path extending through a fluid flow conduit directing the flow to enter a magnetically conductive conduit, establishing the flow of the fluid through a fluid entry port at one end of the magnetically conductive conduit, a fluid impervious boundary wall of the magnetically conductive conduit downstream of the fluid entry port and a fluid discharge port at the other end of the magnetically conductive conduit downstream of the fluid impervious boundary wall and establishing a magnetic field having lines of flux directed along the flow path of the fluid and concentrated within the fluid entry port of the magnetically conductive conduit, within the fluid impervious boundary wall of the magnetically conductive conduit and within the fluid discharge port of the magnetically conductive conduit.

An apparatus for providing fluid treatment at a plurality of distinct points with a single electromagnetic field generator includes a fluid flow conduit to direct a flow of the fluid to be treated to enter a magnetically conductive conduit and a conduit to receive a flow of the fluid to be treated, said receiving conduit comprising a length of magnetically conductive material defining a fluid impervious boundary wall with an inner surface and an outer surface and having a fluid entry port at one end of the conduit, the fluid impervious boundary wall downstream of the fluid entry port and a fluid discharge port as the other end of the conduit downstream of the fluid impervious boundary wall. An electrical conductor may be coiled around the outer surface of the magnetically conductive conduit to form at least one layer of electrical conductor encircling the magnetically conductive conduit with the coils oriented substantially orthogonal to the fluid flow. The coiled conductor forms an electromagnet establishing a magnetic field having lines of flux directed along the flow path of the fluid and concentrated within the fluid entry port, within the fluid impervious boundary wall of the magnetically conductive conduit and within the fluid discharge port when an electrical power supply is coupled to the coiled electrical conductor to energize the electromagnet and produce the magnetic field.

The lines of flux form loops and the magnetic field may be of a strength that allows the flux to extend along the longitudinal axis of the magnetically conductive conduit and concentrate at distinct points beyond each end of the magnetically conductive conduit such that the magnetic flux extends from a point where the lines of flux concentrate beyond one end of the magnetically conductive conduit, around the periphery of the electrical conductor along the longitudinal axis of the magnetically conductive conduit and to a point where the lines of flux concentrate beyond the other end of the magnetically conductive conduit, the magnetically conductive conduit absorbing the magnetic field and the magnetic flux loops generated by the coiled electrical conductor at the points of flux concentration.

Similarly, magnetic fluid treatment may be provided at a plurality of distinct points by utilizing a serial coupling of conduit segments comprising a magnetically conductive inlet conduit segment, a non-magnetically conductive conduit segment and a magnetically conductive outlet conduit segment and having a fluid entry port at a proximal end of the magnetically conductive inlet conduit segment and a fluid discharge port at a distal end of the magnetically conductive outlet conduit segment, each conduit segment defining a fluid impervious boundary wall with an inner surface and an outer surface and having a fluid entry port at one end of the conduit segment and a fluid discharge port at the other end of the conduit segment, said serial coupling of conduit segments establishing a non-magnetically conductive region between the magnetically conductive inlet conduit segment and the magnetically conductive outlet conduit segment. A fluid flow conduit may be utilized to promote the flow of a fluid through the serial coupling of conduit segments, said fluid flow conduit defining a fluid impervious boundary wall with an inner surface and an outer surface. An electrical conductor comprising at least one strand of an electrical conducting material having a first conductor lead and a second conductor lead may be coiled around at least the outer surface of the magnetically conductive inlet conduit segment and the outer surface of the magnetically conductive outlet conduit segment to form at least one layer of electrical conductor encircling the serial coupling of conduit segments before connecting the conductor leads of the electrical conductor to the at least one electrical power supply having a capacity to energize the electrical conductor and produce an electromagnetic field conducted by the magnetically conductive inlet and outlet conduit segments and concentrated within the inner surface of the fluid impervious boundary wall of each magnetically conductive conduit segment, said magnetic field extending beyond the ends of the magnetically conductive inlet and outlet conduit segments along the longitudinal axis of the serial coupling of conduit segments.

A feed stream comprising a fluid column receptive to magnetic treatment may be introduced to the inner surface of the fluid impervious boundary wall of the fluid flow conduit to establish a flow of the fluid through the serial coupling of conduit segments and pass through a first area of magnetic treatment concentrated within the fluid entry port at the proximal end of the magnetically conductive inlet conduit segment, a second area of magnetic treatment concentrated along a path extending through and substantially orthogonal to each turn of the electrical conductor encircling the outer surface of the magnetically conductive inlet conduit segment, a third area of magnetic treatment concentrated within the non-magnetically conductive region between the magnetically conductive inlet conduit segment and the magnetically conductive outlet conduit segment, a fourth area of magnetic treatment concentrated along a path extending through and substantially orthogonal to each turn of the electrical conductor encircling the outer surface of the magnetically conductive outlet conduit segment and a fifth area of magnetic treatment concentrated within the fluid discharge port at the distal end of the magnetically conductive outlet conduit segment before being discharged through the fluid discharge port as a processed feed stream.

The coiled electrical conductor induces a magnetic field to which fluid passing through the serial coupling of conduit segments may be exposed when the supply of electrical power is of sufficient magnitude to induce a magnetic field to fluid passing through the serial coupling of conduit segments.

The feed steam may pass through a separation process prior to passing through the serial coupling of conduit segments or the feed steam may pass through the serial coupling of conduit segments prior to passing through a separation process. Further, a chemical compound may be dispersed into the fluid column prior to passing the feed stream through the serial coupling of conduit segments or the feed stream may pass through the serial coupling of conduit segments prior to dispersing the chemical compound into the fluid column.

An improved embodiment of the instant invention provides a method of providing magnetic fluid treatment at a plurality of distinct points for a plurality of fluids by establishing a flow of a first fluid through a first non-magnetically conductive fluid flow conduit; establishing a flow of a second fluid through a second non-magnetically conductive fluid flow conduit; establishing the flows of the first and second fluids along paths extending through a port at the proximal end of at least one segment of magnetically conductive conduit, a boundary wall downstream of the proximal end of the at least one segment of magnetically conductive conduit and a port at the distal end of the at least one segment of magnetically conductive conduit downstream of the boundary wall and establishing a magnetic field having lines of flux directed along the flow paths of the fluids and concentrated in a plurality of distinct areas along the longitudinal axis of the at least one segment of magnetically conductive conduit. An energized coil of electrical conductor induces the magnetic field to which fluids passing through the at least one segment of magnetically conductive conduit are exposed.

A supply of at least one fluid treatment chemical may be dispersed into a feed stream. A feed stream may be directed through at least one contaminant separation apparatus. A feed stream may be directed through at least one flow conditioning apparatus. A fluid may be selected from a group consisting of water, aqueous-based solutions, petroleum production fluids, refrigerants, hydrocarbon-based fuels, hydrocarbon-based lubricants, synthetic fuels and synthetic lubricants.

Another improved method of providing magnetic fluid treatment in a plurality of distinct areas utilizes a coil of electrical conducting material wound on a coil core. This enhanced method of fabricating the apparatus of the instant invention reduces the weight and length of the coil winding. This method of providing fluid treatment comprises the steps of providing at least one magnetically conductive conduit, each at least one magnetically conductive conduit comprising a length of magnetically conductive material defining a fluid impervious boundary wall with an inner surface and an outer surface and having a port at the proximal end of the conduit and a port at the distal end of the conduit and providing a non-magnetically conductive fluid flow conduit to promote the flow of a fluid through the at least one magnetically conductive conduit, said fluid flow conduit comprising a length of non-magnetically conductive material defining a fluid impervious boundary wall with an inner surface and an outer surface and having a fluid entry port at one end of the conduit and a fluid discharge port at the other end of the conduit.

This method of providing fluid treatment also includes providing a coil core, said coil core comprising at least one tubular conduit defining a boundary wall with an inner surface and an outer surface and having a port at the proximal end of the tube and a port at the distal end of the tube; providing an electrical conductor, said electrical conductor comprising at least one strand of an electrical conducting material having a first conductor lead and a second conductor lead and coiling the electrical conductor around the outer surface of the boundary wall of the coil core to form at least one layer of coiled electrical conductor encircling the coil core.

By providing means for sleeving the at least one magnetically conductive conduit within the boundary wall of the coil core, at least one coil of electrical conductor may encircle at least a section of the outer surface of the fluid impervious boundary wall of said at least one magnetically conductive conduit. Means for deploying the fluid flow conduit proximate the at least one magnetically conductive conduit are also provided in the instant invention.

Connecting the conductor leads of the coiled electrical conductor to at least one electrical power supply, said at least one electrical power supply having a capacity to energize the coiled electrical conductor, produces a magnetic field having energy substantially confined within the boundary wall of the at least one magnetically conductive conduit, said magnetic field extending beyond an end of said at least one magnetically conductive conduit and having energy concentrated in a plurality of distinct areas along the longitudinal axis of the at least one magnetically energized conduit. The energized coil of electrical conductor induces a magnetic field to which the feed stream passing through the at least one magnetically energized conduit is exposed.

Introducing a feed stream comprising a fluid column receptive to magnetic treatment to the fluid entry port of the fluid flow conduit to establishes a flow of the fluid to be treated through the port at the proximal end of the at least one magnetically conductive conduit. The flow of the feed stream is then directed to pass through the plurality of distinct areas of concentrated magnetic energy before being discharged from the port at the distal end of the at least one magnetically conductive conduit a processed fluid.

The electrical conductor may form a first layer and a second layer of electrical conductor encircling the coil core, said first and second coil layers being coaxially disposed and having a non-magnetic stabilizing material disposed between each layer of coiled electrical conductor. Means for disposing a plurality of spacers between the first and second coil layers may be included to establish radial spacing between the first and second coil layers.

A supply of at least one fluid treatment chemical may be dispersed into a feed stream. A feed stream may be directed through at least one contaminant separation apparatus. A feed stream may be directed through at least one flow conditioning apparatus. A fluid may be selected from a group consisting of water, aqueous-based solutions, petroleum production fluids, refrigerants, hydrocarbon-based fuels, hydrocarbon-based lubricants, synthetic fuels and synthetic lubricants.

The instant invention provides an environmentally friendly device capable of inducing a similar ionic charge to dissolved and suspended substances within a fluid column. This typically allows contaminants within a fluid column to become non-adhesive and inhibits their accumulation as deposits within conduits and on surfaces of equipment utilized in the transmission of the fluid. It has also proven to be effective in breaking many oil/water emulsions and thereby improves the efficiency of oil/water separation equipment. In certain applications, magnetic fluid treatment may be effective in eliminating biological contaminants, such as bacteria.

When compared to prior art devices, the instant invention provides superior magnetic fluid treatment by utilizing non-magnetic coupling devices to allow the strength of the magnetic field generated by the energized coil of electrical conductor encircling the magnetically conductive conduit to concentrate at a plurality of distinct points rather than in a single area. Further, the instant invention typically weighs less, generates less heat, requires less electrical energy and generates greater gauss strength than similarly sized prior art devices.

BRIEF DESCRIPTION OF THE DRAWINGS

The accompanying drawings illustrate the preferred embodiments of the invention in which:

FIG. 6 depicts a length of magnetically conductive conduit configured to provide magnetic fluid treatment at a plurality of distinct points:

FIG. 7 depicts a serial coupling of conduit segments configured to provide magnetic fluid treatment at a plurality of distinct points;

DESCRIPTION OF THE PREFERRED EMBODIMENT

The instant invention provides magnetic fluid treatment at a plurality of distinct points to a plurality of fluids by passing feedstocks receptive to magnetic treatment through a plurality of distinct areas of concentrated magnetic energy. An apparatus for providing magnetic treatment in a plurality of distinct areas comprises at least one segment of magnetically conductive conduit to receive the flows of fluids to be treated, each at least one segment of magnetically conductive conduit having a port at the proximal end of the conduit, a boundary wall downstream of the proximal end of the conduit and a port at the distal end of the conduit downstream of the boundary wall; a first non-magnetically conductive fluid flow conduit, said first non-magnetically conductive fluid flow conduit establishing a first flow path extending through the at least one segment of magnetically conductive conduit; a second non-magnetically conductive fluid flow conduit, said second non-magnetically conductive fluid flow conduit establishing a second flow path extending through the at least one segment of magnetically conductive conduit; means for sleeving a section of the first fluid flow conduit and a section of the second fluid flow conduit within the boundary wall of the at least one segment of magnetically conductive conduit; an electrical conductor coiled around the at least one segment of magnetically conductive conduit to form at least one layer of electrical conductor encircling the at least one segment of magnetically conductive conduit with the coils oriented substantially orthogonal to the fluid flow, the coiled electrical conductor forming an electromagnet establishing a magnetic field having lines of flux directed along the flow paths of the fluids and concentrated in a plurality of distinct areas along the longitudinal axis of the at least one segment of magnetically energized conduit; and at least one electrical power supply coupled to the coiled electrical conductor to energize the electromagnet and produce the magnetic field.

The lines of flux form loops and the magnetic field is of a strength that allows the flux to extend along the longitudinal axis of the at least one segment of magnetically energized conduit and concentrate at distinct points beyond each end of the at least one segment of magnetically energized conduit such that the magnetic flux extends from a point where the lines of flux concentrate beyond one end of the at least one segment of magnetically energized conduit, around the periphery of the coiled electrical conductor along the longitudinal axis of the at least one segment of magnetically energized conduit and to a point where the lines of flux concentrate beyond the other end of the at least one segment of magnetically energized conduit. The at least one segment of magnetically energized conduit absorbs the magnetic field and the magnetic flux generated by the coiled electrical conductor at the points of flux concentration.

Figure 1:
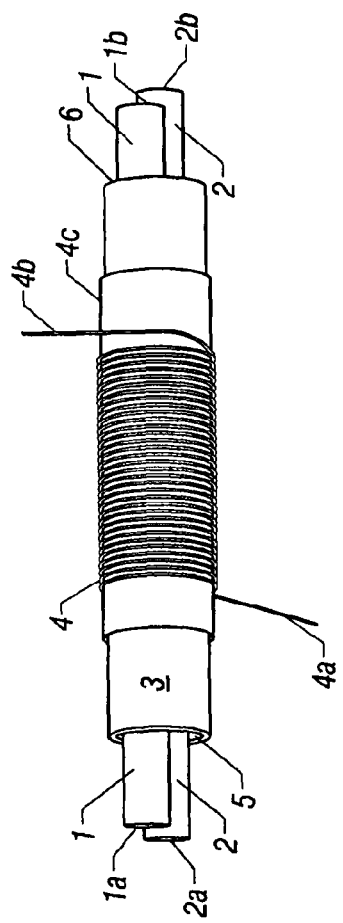
FIG. 1 show a first and a second non-magnetically conductive fluid flow conduit sleeved within the boundary wall of a length of magnetically conductive conduit encircled by a coiled electrical conductor.

The at least one segment of magnetically conductive conduit may comprise a length of magnetically conductive material defining a fluid impervious boundary wall with an inner surface and an outer surface and having a port at the proximal end of the conduit and a port at the distal end of the conduit. FIG. 1 depicts a first apparatus for providing fluid treatment in a plurality of distinct areas for a plurality of fluids with a single electromagnetic field generator First non-magnetically conductive fluid flow conduit 1 and second non-magnetically conductive fluid flow conduit 2 are shown sleeved within the boundary wall of the magnetically conductive conduit 3. Each fluid flow conduit comprises a length of non-magnetically conductive material defining a fluid impervious boundary wall with an inner surface and an outer surface and having a fluid entry port at one end of the conduit and a fluid discharge port at the other end of the conduit.

Magnetically conductive conduit 3 comprises a length of magnetically conductive material defining a boundary wall with an inner surface and an outer surface and having port 5 at the proximal end of the conduit and port 6 at the distal end of the conduit. Electrical conductor 4, comprising at least one strand of an electrical conducting material having a first conductor lead 4a and a second conductor lead 4b, is shown coiled around the outer surface of the magnetically conductive conduit to form at least one layer of coiled electrical conductor encircling the magnetically conductive conduit.

By providing means for sleeving a section of the first fluid flow conduit and a section of the second fluid flow conduit within the boundary wall of the magnetically conductive conduit, the first fluid flow conduit establishes a first flow path extending through the magnetically conductive conduit and the second fluid flow conduit establishes a second flow path extending through the magnetically conductive conduit.

To generate an electromagnetic field, conductor lead 4a and conductor lead 4b of continuous wire coil 4 may be connected to at least one electrical power supply having a capacity to energize the coiled electrical conductor and produce an electromagnetic field conducted by the magnetically conductive conduit and concentrated within the inner surface of the boundary wall of the magnetically conductive conduit, said magnetic field extending beyond an end of the magnetically conductive conduit and concentrated in a plurality of distinct areas along the longitudinal axis of the magnetically energized conduit.

Introducing a first feed stream comprising a first fluid column receptive to magnetic treatment to fluid entry port 1a of the first fluid flow conduit establishes a flow of the first fluid through magnetically energized conduit 3 and introducing a second feed stream comprising a second fluid column receptive to magnetic treatment to fluid entry port 2a of the second fluid flow conduit establishes a flow of the second fluid through magnetically energized conduit 3. The feed streams may be exposed to a first region of magnetic treatment as they flow through the magnetic field concentrated at port 5 at the proximal end of conduit 3. The fluid columns may then be exposed to a second region of magnetic treatment as they are directed along paths extending through and substantially orthogonal to each turn of electrical conductor 4 forming the energized coil of wire surrounding the outer surface of the conduit 3. The feed streams may be exposed to a third region of magnetic treatment as they flow through the magnetic field concentrated at port 6 at the proximal end of conduit 3.

After passing through the plurality of distinct areas of concentrated magnetic energy, the first fluid exiting from fluid discharge port 1b of the first fluid flow conduit may be discharged as a first processed feed stream and the second fluid exiting from fluid discharge port 2b of the second fluid flow conduit may be discharged as a second processed feed stream.

A single strand of electrical conducting material may be utilized to form a single coil layer encircling the magnetically conductive conduit or a single strand of electrical conducting material may be utilized to form a first coil layer and a second coil layer encircling the magnetically conductive conduit. A first strand of electrical conducting material may be utilized to form a first coil layer encircling the magnetically conductive conduit and a second strand of electrical conducting material may be utilized to form a second coil layer encircling the magnetically conductive conduit, said first and second coil layers preferably being coaxially disposed and having a non-magnetic stabilizing material between each layer of coiled electrical conductor to maintain the alignment of the coil layers. A protective housing may be utilized to enclose at least the coiled electrical conductor.

The at least one segment of magnetically conductive conduit may comprise a serial coupling of a magnetically conductive inlet conduit segment, a non-magnetically conductive intermediate conduit segment and a magnetically conductive outlet conduit segment, each conduit segment comprising a length of material defining a fluid impervious boundary wall with an inner surface and an outer surface and having a port at the proximal end of the conduit segment and a port at the distal end of the conduit segment, said serial coupling of conduit segments establishing a non-magnetically conductive region between the magnetically conductive inlet conduit segment and the magnetically conductive outlet conduit segment, said non-magnetically conductive region providing for a concentration of magnetic energy between the magnetically conductive conduit segments.

Figure 2:
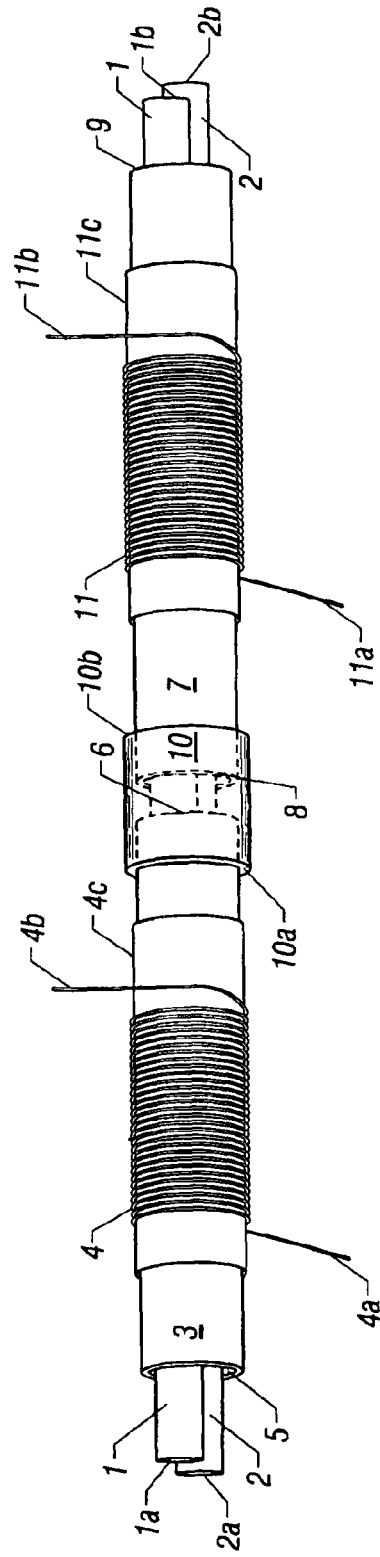
FIG. 2 show a first and a second non-magnetically conductive fluid flow conduit sleeved within the boundary walls of a serial coupling of conduit segments encircled by a coiled electrical conductor.

FIG. 2 depicts an apparatus for providing fluid treatment in a plurality of distinct areas for a plurality of fluids. First non-magnetically conductive fluid flow conduit 1 and second non-magnetically conductive fluid flow conduit 2 are shown sleeved within the boundary walls of a serial coupling of conduit segments comprising magnetically conductive inlet conduit segment 3, non-magnetically conductive conduit segment 10 and magnetically conductive outlet conduit segment 7. Each fluid flow conduit comprises a length of non-magnetically conductive material defining a fluid impervious boundary wall with an inner surface and an outer surface and having a fluid entry port at one end of the conduit and a fluid discharge port at the other end of the conduit.

The serial coupling of the magnetically conductive inlet conduit segment, non-magnetically conductive conduit segment and a magnetically conductive outlet conduit segment has a port 5 at the proximal end of the magnetically conductive inlet conduit segment 3 and a port 9 at the distal end of the magnetically conductive outlet conduit segment 7. Each conduit segment comprises a length of material defining a boundary wall with an inner surface and an outer surface and having a port at the proximal end of the conduit segment and a port at the distal end of the conduit segment. Magnetically conductive inlet conduit segment 3 comprises a length of magnetically conductive material defining a boundary wall with an inner surface and an outer surface and having port 5 at the proximal end of the conduit segment and port 6 at the distal end of the conduit segment. Non-magnetically conductive conduit segment 10 comprises a length of non-magnetically conductive material defining a boundary wall with an inner surface and an outer surface and having port 10a at the proximal end of the conduit segment and port 10b at the distal end of the conduit segment. Magnetically conductive inlet conduit segment 7 comprises a length of magnetically conductive material defining a boundary wall with an inner surface and an outer surface and having port 8 at the proximal end of the conduit segment and port 9 at the distal end of the conduit segment. The serial coupling of conduit segments establishes a non-magnetically conductive region between magnetically conductive inlet conduit segment 3 and magnetically conductive outlet conduit segment 7.

An electrical conductor comprising at least one strand of electrical conducting material having a first conductor lead and a second conductor lead may be coiled around at least a section of the outer surface of the magnetically conductive inlet conduit segment and a section of the outer surface of the magnetically conductive outlet conduit segment to form at least one layer of electrical conductor encircling the serial coupling of conduit segments. Electrical conductor 4 having a first conductor lead 4a and a second conductor lead 4b is shown coiled around the outer surface of magnetically conductive inlet conduit 3 and electrical conductor 11 having a first conductor lead 11a and a second conductor lead 11b is shown coiled around the outer surface of magnetically conductive outlet conduit 7.

By providing means for sleeving a section of the first fluid flow conduit and a section of the second fluid flow conduit within the boundary walls of the serial coupling of conduit segments, the first fluid flow conduit establishes a first flow path extending through the serial coupling of conduit segments and the second fluid flow conduit establishes a second flow path extending through the serial coupling of conduit segments.

To generate an electromagnetic field, conductor leads 4a and 4b of continuous wire coil 4 and conductor leads 11a and 11b of continuous wire coil 11 may be connected to at least one electrical power supply having a capacity to energize the coiled electrical conductor and produce an electromagnetic field conducted by the magnetically conductive inlet conduit segment and the magnetically conductive outlet conduit segment and concentrated within the inner surface of the boundary wall of each magnetically conductive conduit segment, said magnetic field extending beyond an end of each magnetically conductive conduit segment and concentrated in a plurality of distinct areas along the longitudinal axis of the magnetically energized serial coupling of conduit segments.

Introducing a first feed stream comprising a first fluid column receptive to magnetic treatment to fluid entry port 1a of the first fluid flow conduit establishes a flow of the first fluid through magnetically energized conduits 3 and 7 and introducing a second feed stream comprising a second fluid column receptive to magnetic treatment to fluid entry port 2a of the second fluid flow conduit establishes a flow of the second fluid through magnetically energized conduits 3 and 7.

The feed streams may be exposed to a first region of magnetic treatment as they flow through the magnetic field concentrated at port 5 at the proximal end of magnetically conductive inlet conduit segment 3. The fluid columns may then be exposed to a second region of magnetic treatment as they are directed along paths extending through and substantially orthogonal to each turn of electrical conductor 4 forming the energized coil of wire surrounding the outer surface of magnetically conductive inlet conduit segment 3. The feed streams may be exposed to a third region of magnetic treatment as they flow through the non-magnetically conductive region between port 6 at the distal end of magnetically conductive inlet conduit segment 3 and port 8 at the proximal end of magnetically conductive outlet conduit segment 7. The fluid columns may then be exposed to a fourth region of magnetic treatment as they are directed along paths extending through and substantially orthogonal to each turn of electrical conductor 11 forming the energized coil of wire surrounding the outer surface of magnetically conductive outlet conduit segment 7. The feed streams may be exposed to a fifth region of magnetic treatment as they flow through the magnetic field concentrated at port 9 at the proximal end of magnetically conductive outlet conduit segment 7. After passing through the plurality of distinct areas of concentrated magnetic energy, the first fluid exiting from fluid discharge port 1b of the first fluid flow conduit may be discharged as a first processed feed stream and the second fluid exiting from fluid discharge port 2b of the second fluid flow conduit may be discharged as a second processed feed stream.

The electrical conductor may comprise a single strand of electrical conducting material forming at least one coil layer encircling the magnetically conductive inlet conduit segment and at least one coil layer encircling the magnetically conductive outlet conduit segment or the electrical conductor may comprise a single strand of electrical conducting material forming at least one coil layer encircling the magnetically conductive inlet conduit segment, the non-magnetically conductive conduit segment and the magnetically conductive outlet conduit segment.

The electrical conductor may also comprise a first and second strand of electrical conducting material forming a first and second coil layer encircling the magnetically conductive inlet conduit segment and a first and second coil layer encircling the magnetically conductive outlet conduit segment or the electrical conductor may comprise a first and second strand of electrical conducting material forming a first and second coil layer encircling the magnetically conductive inlet conduit segment, the non-magnetically conductive conduit segment and the magnetically conductive outlet conduit segment, said first and second coil layers preferably being coaxially disposed and having a non-magnetic stabilizing material between each layer of coiled electrical conductor to maintain the alignment of the coil layers. A protective housing may be utilized to enclose at least the coiled electrical conductor.

The at least one magnetically conductive conduit may also comprise a noncontiguous array of a first magnetically conductive conduit and a second magnetically conductive conduit, each magnetically conductive conduit comprising a length of magnetically conductive material defining a fluid impervious boundary wall with an inner surface and an outer surface and having a port at the proximal end of the conduit and a port at the distal end of the conduit, whereby a space between said first and second magnetically conductive conduits establishes a non-magnetically conductive region, said non-magnetically conductive region providing for a concentration of magnetic energy between said magnetically energized conduits.

Figure 3:
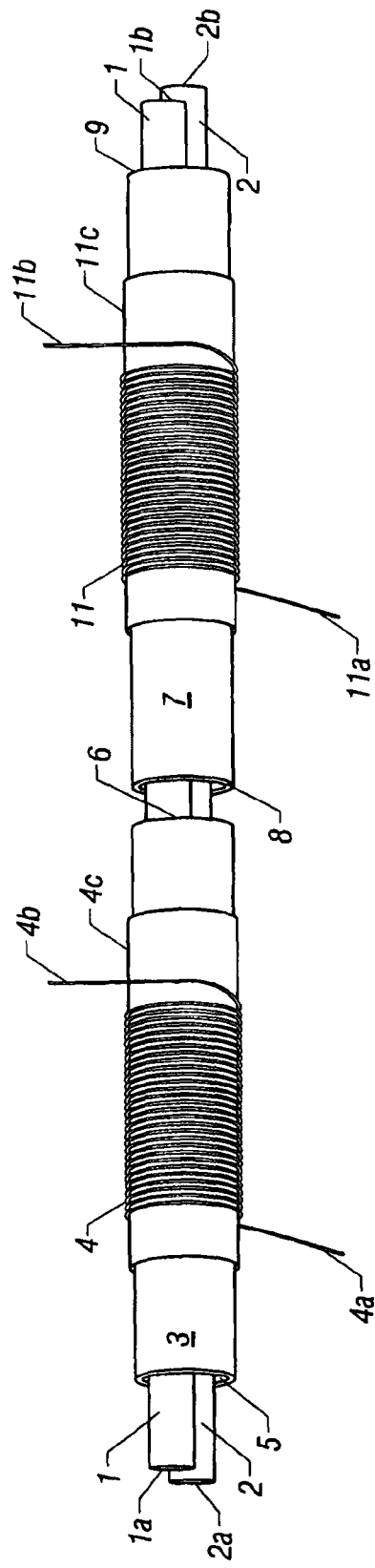
FIG. 3 show a first and a second non-magnetically conductive fluid flow conduit sleeved within the boundary walls of a non-contiguous array of a first length of magnetically conductive conduit encircled by a coiled electrical conductor and a second length of magnetically conductive conduit encircled by a coiled electrical conductor.

FIG. 3 depicts a third apparatus for providing treatment in a plurality of distinct areas for a plurality of fluids. First non-magnetically conductive fluid flow conduit 1 and second non-magnetically conductive fluid flow conduit 2 are shown sleeved within the boundary walls of a non-contiguous array of magnetically conductive conduit 3 and magnetically conductive conduit 7. Each fluid flow conduit comprises a length of non-magnetically conductive material defining a fluid impervious boundary wall with an inner surface and an outer surface and having a fluid entry port at one end of the conduit and a fluid discharge port at the other end of the conduit.

Magnetically conductive inlet conduit segment 3 comprises a length of magnetically conductive material defining a boundary wall with an inner surface and an outer surface and having port 5 at the proximal end of the conduit segment and port 6 at the distal end of the conduit segment. Magnetically conductive inlet conduit segment 7 comprises a length of magnetically conductive material defining a boundary wall with an inner surface and an outer surface and having port 8 at the proximal end of the conduit segment and port 9 at the distal end of the conduit segment. This non-contiguous array of magnetically conductive conduits establishes a non-magnetically conductive region between magnetically conductive inlet conduit segment 3 and magnetically conductive outlet conduit segment 7.

An electrical conductor comprising at least one strand of electrical conducting material having a first conductor lead and a second conductor lead may be coiled around at least a section of the outer surface of each magnetically conductive conduit to form at least one layer of electrical conductor encircling the magnetically conductive conduits. Electrical conductor 4 having a first conductor lead 4a and a second conductor lead 4b is shown coiled around the outer surface of magnetically conductive inlet conduit 3 and electrical conductor 11 having a first conductor lead 11a and a second conductor lead 11b is shown coiled around the outer surface of magnetically conductive outlet conduit 7.

By providing means for sleeving a section of the first fluid flow conduit and a section of the second fluid flow conduit within the boundary walls of the non-contiguous array of magnetically conductive conduits, the first fluid flow conduit establishes a first flow path extending through the magnetically conductive conduits and the second fluid flow conduit establishes a second flow path extending through the magnetically conductive conduits.

To generate an electromagnetic field, conductor leads 4a and 4b of continuous wire coil 4 and conductor leads 11a and 11b of continuous wire coil 11 may be connected to at least one electrical power supply having a capacity to energize the coiled electrical conductor and produce an electromagnetic field conducted by magnetically conductive conduit 3 and magnetically conductive conduit 7 and concentrated within the inner surface of the boundary wall of each magnetically conductive conduit segment, said magnetic field extending beyond an end of each magnetically conductive conduit segment and concentrated in a plurality of distinct areas along the longitudinal axis of the non-contiguous array of magnetically energized conduits.

Introducing a first feed stream comprising a first fluid column receptive to magnetic treatment to fluid entry port 1a of the first fluid flow conduit establishes a flow of the first fluid through magnetically energized conduits 3 and 7 and introducing a second feed stream comprising a second fluid column receptive to magnetic treatment to fluid entry port 2a of the second fluid flow conduit establishes a flow of the second fluid through magnetically energized conduits 3 and 7. The feed streams may be exposed to a first region of magnetic treatment as they flow through the magnetic field concentrated at port 5 at the proximal end of conduit 3. The fluid columns may then be exposed to a second region of magnetic treatment as they are directed along paths extending through and substantially orthogonal to each turn of electrical conductor 4 forming the energized coil of wire surrounding the outer surface of the conduit 3. The feed streams may be exposed to a third region of magnetic treatment as they flow through the non-magnetically conductive region between port 6 at the distal end of magnetically conductive inlet conduit segment 3 and port 8 at the proximal end of magnetically conductive outlet conduit segment 7. The fluid columns may then be exposed to a fourth region of magnetic treatment as they are directed along paths extending through and substantially orthogonal to each turn of electrical conductor 11 forming the energized coil of wire surrounding the outer surface of the conduit 7. The feed streams may be exposed to a fifth region of magnetic treatment as they flow through the magnetic field concentrated at port 9 at the proximal end of conduit 7. The first fluid exiting from fluid discharge port 1b of the first fluid flow conduit may be discharged as a first processed feed stream and the second fluid exiting from fluid discharge port 2b of the second fluid flow conduit may be discharged as a second processed feed stream.

The electrical conductor may comprise a single strand of electrical conducting material forming at least one coil layer encircling first magnetically conductive conduit 3 and at least one coil layer encircling second magnetically conductive conduit 7 or the electrical conductor may comprise a single strand of electrical conducting material forming at least one coil layer encircling the first magnetically conductive conduit, the non-magnetically conductive region between the magnetically conductive conduits and the second magnetically conductive conduit.

The electrical conductor may also comprise a first and second strand of electrical conducting material forming a first and second coil layer encircling the first magnetically conductive conduit and a first and second coil layer encircling the second magnetically conductive conduit or the electrical conductor may comprise a first and second strand of electrical conducting material forming a first and second coil layer encircling the first magnetically conductive conduit, the non-magnetically conductive region between the magnetically conductive conduits and the second magnetically conductive conduit, said first and second coil layers preferably being coaxially disposed and having a non-magnetic stabilizing material between each layer of coiled electrical conductor to maintain the alignment of the coil layers. A single strand of electrical conducting material may be connected to a single supply of electrical power or a first supply of electrical power and a second supply of electrical power. In instances where a first and second strand of electrical conducting material comprise the coil, the first and second conductor leads of strands of electrical conducting material may connected in series or parallel to a single supply of electrical power, or the first and second conductor leads of the first strand of electrical conducting material may connected to a first supply of electrical power and the first and second conductor leads of the second strand of electrical conducting material may be connected to a second supply of electrical power.

At least one dispersing apparatus may provide means for distributing a supply of at least one fluid treatment chemical into a feed stream. At least one separation apparatus may provide means for separating and collecting a volume of contaminants from a fluid and discharging a processed feed stream having a reduced volume of contaminants carried within a treated fluid column. At least one fluid conditioning apparatus may provide means for conditioning the flow of a feed stream directed to pass through the plurality of distinct areas of concentrated magnetic energy.

An improved apparatus for providing magnetic fluid treatment in a plurality of distinct areas utilizes electrical conducting material wound on a coil core rather than on the outer surface of the fluid impervious boundary wall of the at least one magnetically conductive conduit. In many applications, large diameter conduits or extended lengths of coiled electrical conducting material are required to induce a magnetic field having a capacity to effectively treat a feed stream passing through the larger diameter conduits. This improved fluid treatment apparatus comprises at least one magnetically conductive conduit, each at least one magnetically conductive conduit comprising a length of magnetically conductive material defining a fluid impervious boundary wall with an inner surface and an outer surface and having a port at the proximal end of the conduit and a port at the distal end of the conduit; a non-magnetically conductive fluid flow conduit to promote the flow of a fluid through the at least one magnetically conductive conduit, said fluid flow conduit comprising a length of non-magnetically conductive material defining a fluid impervious boundary wall with an inner surface and an outer surface and having a fluid entry port at one end of the conduit and a fluid discharge port at the other end of the conduit; a coil core, said coil core comprising at least one tubular conduit defining a boundary wall with an inner surface and an outer surface and having a port at the proximal end of the tube and a port at the distal end of the tube; an electrical conductor comprising at least one strand of an electrical conducting material having a first conductor lead and a second conductor lead, said electrical conductor coiled around the outer surface of the boundary wall of the coil core to form at least one layer of coiled electrical conductor encircling the coil core; means for sleeving the at least one magnetically conductive conduit within the boundary wall of the coil core, whereby at least one coil of electrical conductor encircles at least a section of the outer surface of the fluid impervious boundary wall of said at least one magnetically conductive conduit; means for deploying the fluid flow conduit proximate the at least one magnetically conductive conduit; and at least one electrical power supply having a capacity to energize the coiled electrical conductor and produce a magnetic field having energy substantially confined within the inner surface of the boundary wall of the at least one magnetically conductive conduit, said magnetic field extending beyond an end of said at least one magnetically conductive conduit and having energy concentrated in a plurality of distinct areas along the longitudinal axis of the at least one magnetically energized conduit.

The instant invention includes a method of fluid treatment, comprising the steps of establishing a flow of a fluid to be treated along a path extending through a fluid entry port at the proximal end of a magnetically conductive conduit, wherein at least a section of an outer surface of the magnetically conductive conduit is sleeved with at least one coil core; and establishing a magnetic field having lines of flux directed along the flow path of the fluid and concentrated in a plurality of distinct areas along the longitudinal axis of the magnetically energized conduit.

The instant method may further comprise the step of directing the fluid to pass through at least one non-magnetically conductive fluid flow conduit to promote the flow of a fluid through the magnetically conductive conduit.

The instant method may further comprise one or more of the steps of dispersing at least one fluid treatment chemical into the fluid, directing the fluid through at least one contaminant separation process or directing the fluid through at least one fluid flow conditioning process.

The instant invention includes an apparatus providing fluid treatment, comprising a magnetically conductive conduit to receive a flow of a fluid to be treated along a path extending through the magnetically conductive conduit, the magnetically conductive conduit having a fluid entry port at the proximal end of the conduit, at least one fluid impervious boundary wall downstream of the fluid entry port and a fluid discharge port at the distal end of the conduit; an electrical conductor comprising at least one length of an electrical conducting material having a first conductor lead and a second conductor lead, the electrical conductor coiled around at least one coil core with at least one turn to form at least one uninterrupted coil of electrical conductor encircling each coil core, each coil forming at least one layer of coiled electrical conductor; means for sleeving the magnetically conductive conduit within the at least one coil core, whereby at least one turn of electrical conductor encircles at least a section of the outer surface of the magnetically conductive conduit with the coils oriented substantially orthogonal to the fluid flow; and at least one electrical power supply operably connected to at least one conductor lead, wherein the coiled electrical conductor is energized to produce a magnetic field having lines of flux directed along the fluid flow path and concentrated in a plurality of distinct areas along the longitudinal axis of the magnetically energized conduit.

The lines of flux form loops and the magnetic field is of a strength that allows the flux to extend along the longitudinal axis of the magnetically conductive conduit and concentrate at distinct points beyond each end of each fluid impervious boundary wall such that the magnetic flux extends from a point where the lines of flux concentrate beyond one end of the magnetically conductive conduit, around the periphery of the coiled electrical conductor along the longitudinal axis of each fluid impervious boundary wall and to a point where the lines of flux concentrate beyond the other end of the magnetically conductive conduit. Each fluid impervious boundary wall absorbs the magnetic field and the magnetic flux loops generated by the coiled electrical conductor at the points of flux concentration.

The magnetically conductive conduit may be selected from a group comprising a length of magnetically conductive material defining a fluid impervious boundary wall with an inner surface and an outer surface and having a port at the proximal end of the conduit and a port at the distal end of the conduit, a non-contiguous array of a first length of magnetically conductive conduit and a second length of magnetically conductive conduit, a serial coupling of conduit segments comprising a magnetically conductive inlet conduit segment, a non-magnetically conductive intermediate conduit segment and a magnetically conductive outlet conduit segment or a first magnetically conductive conduit sleeved within a second magnetically conductive conduit.

The instant apparatus may further comprise at least one non-magnetically conductive fluid flow conduit to promote the flow of a fluid through the magnetically conductive conduit.

The instant apparatus may further comprise at least one chemical dispersing apparatus, each at least one dispersing apparatus providing means for distributing least one fluid treatment chemical into a fluid. The instant apparatus may further comprise at least one contaminant separation apparatus, each at least one separation apparatus providing means for separating and collecting a volume of contaminants from a fluid and discharging a processed fluid having a reduced volume of contaminants carried within the fluid. The instant apparatus may further comprise at least one fluid flow conditioning apparatus, each at least one fluid conditioning apparatus providing means for altering the flow of a fluid.

Figure 4:
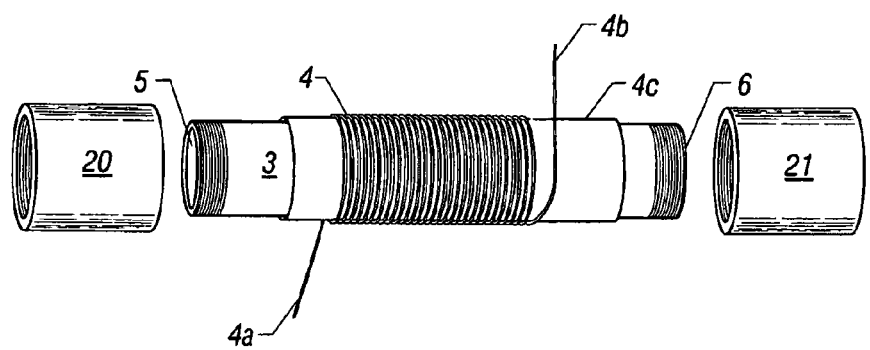
FIG. 4 is an exploded view of the instant invention.

FIG. 4 is an exploded view of the instant invention. Electrical conductor 4, comprising a continuous strand of an electrical conducting material having a first conductor lead 4a and a second conductor lead 4b, is shown coiled around coil core 4c. Coil core 4c is shown sleeving a section of conduit 3, comprising a fluid impervious boundary wall with an inner surface and an outer surface and having fluid entry port 5 at the proximal end of the conduit and fluid discharge port 6 at the distal end of the conduit, so that an uninterrupted coil of electrical conductor encircles a section of conduit 3. To generate an electromagnetic field, at least one electrical power supply may be operably connected to at least one conductor lead to energize the coiled electrical conductor to produce a magnetic field having lines of flux directed along the fluid flow path established by conduit 3 and concentrated in a plurality of distinct areas along the longitudinal axis of the magnetically energized conduit. At least one electrical power supply may be operably connected to at least one conductor lead to energize the coiled electrical conductor to produce a magnetic field having lines of flux directed along the fluid flow path. Non-magnetically conductive inlet conduit segment 20 and non-magnetically conductive outlet conduit segment 21 may be utilized to make fluid impervious, non-contiguous connections of inlet port 5 and outlet port 6 with additional segments of conduit to promote the flow of fluid through magnetically energized conduit 3.

Figure 5:
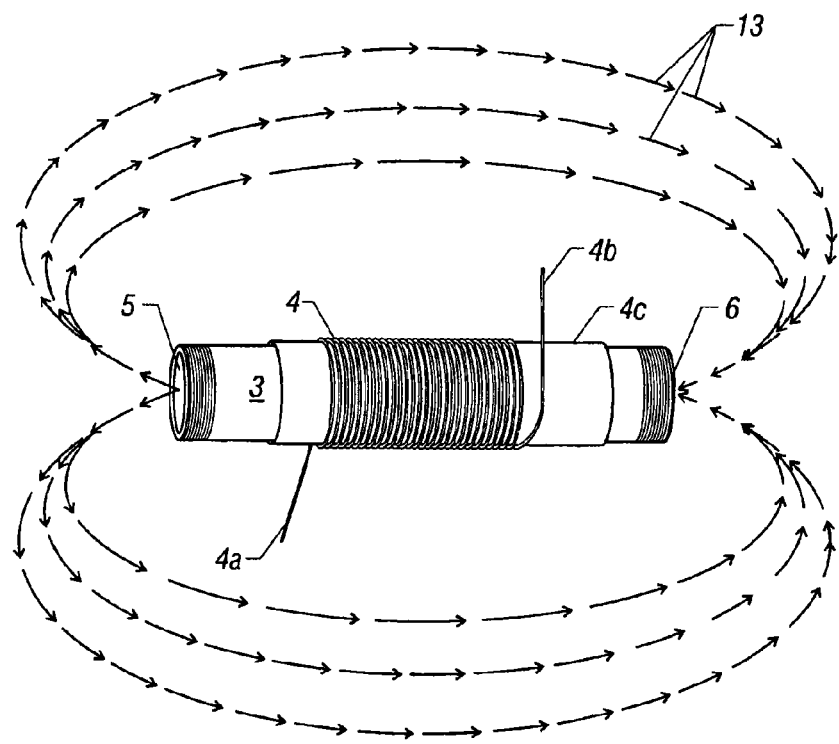
FIG. 5 shows the flow of magnetic flux loops encircling a length of magnetically energized conduit.

FIG. 5 shows the flow of magnetic flux loops 13 generated by energized coil 4 encircling coil core 4c, with the coil core shown sleeving a section of magnetically energized conduit 3. Operably connecting first conductor lead 4a and second conductor lead 4b to at least one supply of electrical power energizes the coiled electrical conductor and produces an electromagnetic field conducted by the magnetically conductive conduit and concentrated within the inner surface of the fluid impervious boundary wall of the conduit. However, to provide effective magnetic fluid treatment at a plurality of distinct points, the magnetic field must be of sufficient strength to extend beyond the ends of the length of the conduit. Magnetic flux loops 13 are shown consolidated at a point beyond inlet port 5 of magnetically energized conduit 3, flowing around the periphery of continuous coil 4 along the longitudinal axis of the conduit and reconsolidating at a point beyond outlet port 6 at the other end of the conduit. The magnetic field absorbed by magnetically conductive conduit 3 and the magnetic flux loops generated by the energized coil tend to concentrate in three distinct regions along a path extending through of the conduit; at inlet port 5, along the path extending through and substantially orthogonal to each turn of electrical conductor forming the energized coil 4 surrounding a section of the outer surface of conduit 3 and at outlet port 6. A fluid directed along a flow path extending through these three regions may receive magnetic treatment at a plurality of distinct points.

FIG. 6 depicts an arrangement of components that provide magnetic fluid treatment at a plurality of distinct points. Electrical conductor 4 is shown as an uninterrupted coil of electrical conductor encircling coil core 4c, with the coil core sleeving a section of the outer surface of magnetically conductive conduit 3. Non-magnetic coupling devices 20 and 21 are shown connected to each end of magnetically conductive conduit 3. These non-magnetically conductive conduit segments allow for the fluid impervious, non-contiguous connection of conduit 3 with additional segments of conduit. The non-contiguous connections between magnetically energized conduit 3 and additional segments of magnetically conductive conduit typically provides for an increased concentration of magnetic energy at inlet port 5 and outlet port 6 due to the concentration of magnetic energy in the space between the non-contiguous magnetically conductive conduits.

To generate an electromagnetic field, first conductor lead 4a and second conductor lead 4b may be operably connected to at least one electrical power supply to energize the coiled electrical conductor to produce a magnetic field having lines of flux directed along the fluid flow path established by conduit 3. A feed stream comprising a fluid column receptive to magnetic treatment may be introduced to inlet port 20a of first non-magnetic coupling device 20 to establish the flow of the fluid column through the instant invention and exposed to a first region of magnetic treatment as it flows through the magnetic field concentrated at inlet port 5 of conduit 3. The feedstock may then enter conduit 3 and flow past outlet port 20b and be exposed to a second region of magnetic treatment as it is directed along a path extending through and substantially orthogonal to each turn of electrical conductor 4 forming the energized coil encircling a segment of the outer surface of magnetically conductive conduit 3. The feed stream may then be directed to exit the conduit where it may then be exposed to a third region of magnetic treatment as the fluid flows past inlet port 21a of second non-magnetic coupling device 21 and directed to pass through the magnetic field concentrated at outlet port 6 of conduit 3. The fluid column may then be discharged from outlet port 21b as a processed feedstock.

The utilization of a non-magnetic coupling device to provide for the non-contiguous connection between the outlet port of a first magnetically energized conduit and the inlet port of a second magnetically energized conduit has been shown to provide a distinct point of enhanced magnetic fluid treatment in the space between the magnetically energized conduits. FIG. 7 depicts a serial coupling of conduit segments comprising non-magnetically conductive conduit segment 21 making a fluid impervious, non-contiguous connection between first magnetically conductive conduit 3 and second magnetically conductive conduit 7 and establishing a fluid flow path. An electrical conductor comprising a first length of an electrical conducting material having a first conductor lead and a second conductor lead and a second length of an electrical conducting material having a first conductor lead and a second conductor lead is shown forming first uninterrupted coil of electrical conductor 4 encircling coil core 4c, with coil core 4c shown sleeving a section of magnetically conductive conduit 3 and second uninterrupted coil of electrical conductor 11 encircling coil core 11c, with coil core 11c shown sleeving a section of magnetically conductive conduit 7. At least one electrical power supply may be operably connected to at least one of conductor leads 4a, 4b, 11a or 11b to energize the coiled electrical conductor to produce a magnetic field having lines of flux directed along the fluid flow path.

When voltage is supplied to the coils, the magnetic field generated by coiled electrical conductor 4 is absorbed by magnetically conductive conduit 3 and the magnetic field generated by coiled electrical conductor 11 is absorbed by magnetically conductive conduit 7. The non-contiguous connection of magnetically energized conduits 3 and 5 provides for a distinct point of magnetic fluid treatment as magnetic energy is concentrated in the space between outlet port 6 and inlet port 8. A feed stream comprising a fluid column receptive to magnetic treatment may be introduced to inlet port 5 to establish a flow of a fluid through the serial coupling of conduit segments and then exposed to a first region of fluid treatment in the magnetic field concentrated at inlet port 5. As the feed stream flows into conduit 3, it may then be exposed to a second region of magnetic treatment as the fluid is directed along a path extending through and substantially orthogonal to each turn of the electrical conductor forming the coil 4 encircling a section of the outer surface of magnetically energized conduit 3.

The feed stream may then be directed to pass through inlet port 21*a* of non-magnetically conductive conduit 21 and through outlet port 6 of magnetically energized conduit 3 where it may then be exposed to a third region of magnetic treatment in the space between outlet port 6 and inlet port 8. The feed stream may then continue to flow through inlet port 8 and outlet port 21*b* of non-magnetically conductive conduit 21 into conduit 7 where the fluid column may then be exposed to a fourth region of magnetic treatment along a path extending through and substantially orthogonal to each turn of the electrical conductor forming coil 11 encircling a section of the outer surface of magnetically energized conduit 7. The fluid may then be exposed to a fifth region of magnetic treatment concentrated at outlet port 9 as the feed stream flows out of conduit 7.

In some instances, non-magnetically conductive fluid flow conduits 20 and 22 may be utilized to make fluid impervious, non-contiguous connections with flanking segments of conduit to promote the flow of fluid through the magnetically energized series coupling of conduit segments. Outlet port 20*b* of non-magnetically conductive fluid flow conduit 20 may be utilized to form a fluid impervious connection with magnetically energized conduit 3 so that a feed stream introduced to inlet port 20*a* may establish a flow of a fluid column through the magnetically energized conduit. Inlet port 22*a* of non-magnetically conductive fluid flow conduit 22 may be utilized to form a fluid impervious connection with magnetically energized conduit 7 so that fluid directed through outlet port 22*b* may be discharged as a processed feedstock.

Figure 8:
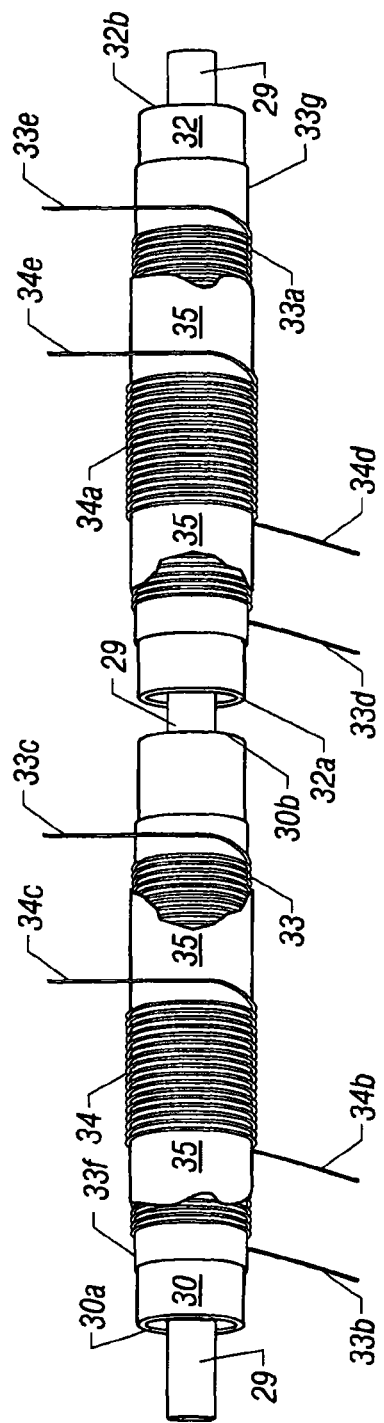
FIG. 8 shows a non-contiguous array of magnetically conductive conduits sleeving a non-magnetically conductive fluid flow conduit configured to provide magnetic fluid treatment at a plurality of distinct points.

FIG. 8 shows a non-contiguous array of first magnetically conductive conduit 30 and second magnetically conductive conduit 32. Fluid flow conduit 29, comprising a length of non-magnetically conductive material defining a fluid impervious boundary wall with an inner surface and an outer surface and having a fluid entry port at one end of the conduit and a fluid discharge port at the other end of the conduit, is shown extending through fluid entry port 30*a* at the proximal end of magnetically conductive conduit 30 and fluid discharge port 32*b* at a distal end of the magnetically conductive conduit 32 to establish a flow path for a fluid to be treated through the non-contiguous array of magnetically conductive conduits.

An electrical conductor comprising a first length of an electrical conducting material having first conductor lead 33*b* and second conductor lead 33*c* forms first coil layer 33 encircling coil core 33*f*, a second length of an electrical conducting material having first conductor lead 34*b* and second conductor lead 34*c* forms second coil layer 34 encircling coil core 33*f*, a third length of an electrical conducting material having first conductor lead 33*d* and second conductor lead 33*e* forms first coil layer 33*a* encircling coil core 33*g* and a fourth length of an electrical conducting material having first conductor lead 34*d* and second conductor lead 34*e* forms second coil layer 34*a* encircling coil core 33*g*. Coil core 33*f* is shown sleeving a section of the outer surface of magnetically conductive conduit 30 and coil core 33*g* is shown sleeving a section of the outer surface of magnetically conductive conduit 32. A thin sheet of a non-magnetically conductive material 35 is shown disposed between the first and second layers of electrical conductor encircling the coil cores to maintain the alignment of the coil layers. At least one electrical power supply may be operably connected to at least one conductor lead to energize the coiled electrical conductor to produce a magnetic field having lines of flux directed along the fluid flow path.

Fluid flowing through non-magnetically conductive fluid flow conduit 29 may be directed to pass through a plurality of distinct areas of concentrated magnetic energy provided by the non-contiguous array of magnetically conductive conduits; a first region of fluid treatment in the magnetic field concentrated at inlet port 30*a*, a second region of magnetic treatment as the fluid is directed along a path extending through and substantially orthogonal to each turn of the electrical conductor forming the coils 33 and 34 encircling magnetically conductive conduit 30, a third region of magnetic treatment in the space between outlet port 30*b* and inlet port 32*a*, a fourth region of magnetic treatment along a path extending through and substantially orthogonal to each turn of the electrical conductor forming coils 33*a* and 34*a* encircling the outer surface of magnetically conductive conduit 32 and a fifth region of magnetic treatment concentrated at outlet port 32*b*.

Figure 9:
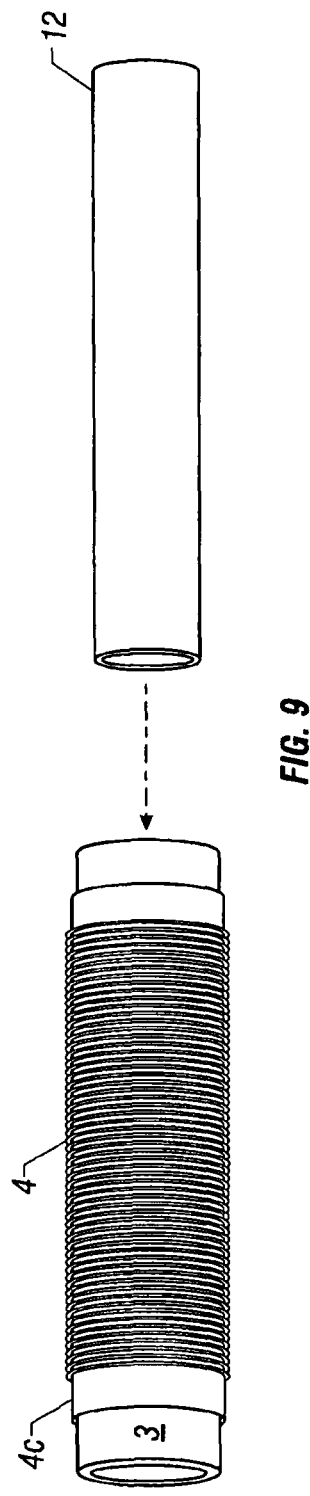
FIG. 9 is an exploded view of a first magnetically conductive conduit adapted to sleeve a second magnetically conductive conduit.

Increasing the density and thickness of the fluid impervious boundary wall of the magnetically conductive conduit typically results in a greater concentration of magnetic energy at each end of a magnetically energized conduit and any non-magnetically conductive regions established between magnetically conductive conduits. One means of increasing the density and thickness of the boundary wall of the magnetically conductive conduit is to sleeve a second magnetically conductive conduit within a first magnetically conductive conduit, whereby at least a section of the inner surface of the boundary wall of the first magnetically conductive conduit is coaxially disposed in substantially concentric surrounding relation to at least a section of the outer surface of the boundary wall of the second magnetically conductive conduit. FIG. 9 is an exploded view of first magnetically conductive conduit 3 comprising a fluid impervious boundary wall with an inner surface and an outer surface and having a fluid entry port at one end of the conduit and fluid discharge port at the other end of the conduit adapted to sleeve second magnetically conductive conduit 12. Electrical conductor 4 is shown encircling coil core 4*c*. Coil core 4*c* is shown sleeving a section of conduit 3 so that an uninterrupted coil of electrical conductor encircles a section of conduit 3.

Figure 10:
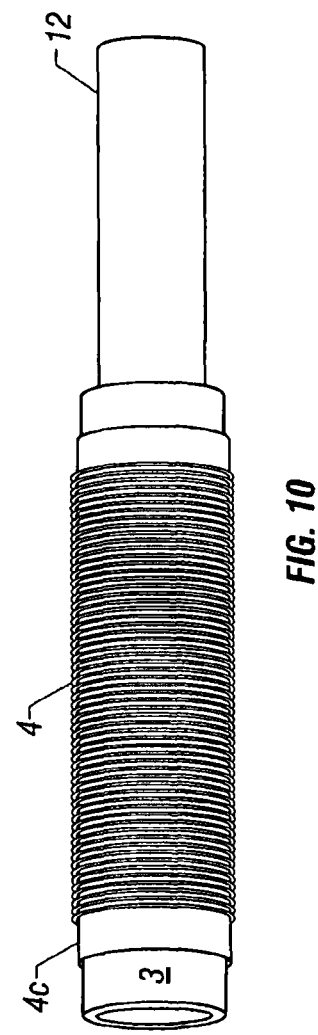
FIG. 10 shows a second magnetically conductive conduit being inserted in a first magnetically conductive conduit.

FIG. 10 shows second magnetically conductive conduit 12 being inserted into first magnetically conductive conduit 3. Electrical conductor 4 is shown encircling coil core 4*c*, with the coil core sleeving a section of conduit 3.

Figure 11:
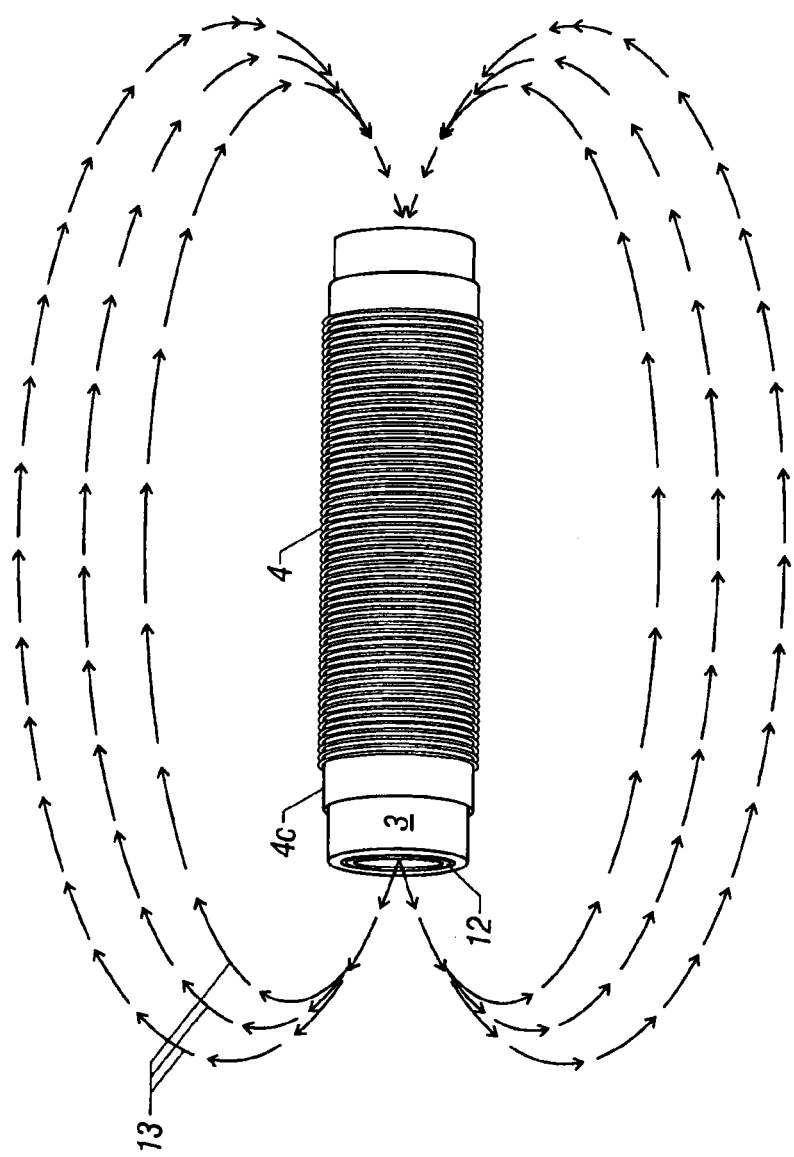
FIG. 11 shows the flow of magnetic flux loops encircling an array of a first magnetically conductive conduit sleeving a second magnetically conductive conduit.

FIG. 11 shows the flow of magnetic flux loops 13 as they flow along the longitudinal axis of the array of first magnetically energized conduit 3 sleeving second magnetically conductive conduit 12. Electrical conductor 4 is shown encircling coil core 4*c*. Coil core 4*c* is shown sleeving a section of conduits 3 and 12 so that an uninterrupted coil of electrical conductor encircles a section of conduit 3 and conduit 12.

Magnetic flux loops 13 are shown consolidated at a point beyond the inlet ports of sleeved array of magnetically energized conduits, flowing around the periphery of continuous coil 4 along the longitudinal axis of the sleeved array of conduits and reconsolidating at a point beyond the outlet ports at the other end of the conduits. The magnetic field absorbed by magnetically conductive conduits 3 and 12 and the magnetic flux loops generated by the energized coil tend to concentrate in three distinct regions along a path extending through of the conduits; at the inlet ports of the sleeved array of conduits, along the path extending through and substantially orthogonal to each turn of electrical conductor forming the energized coil 4 surrounding the outer surface of conduits 3 and 12 and at the outlet ports of the conduits. Fluid directed along a flow path extending through these three regions may receive magnetic treatment at a plurality of distinct points.

Thus, the instant invention includes a method of fluid treatment, comprising the steps of establishing a flow of a fluid to be treated along a path extending through a magnetically conductive conduit, wherein at least a section of an outer surface of the magnetically conductive conduit is sleeved with at least one coil core; and establishing a magnetic field having lines of flux directed along the fluid flow path and concentrated in a plurality of distinct areas along the longitudinal axis of the magnetically energized conduit. The instant method may further comprise the step of directing the fluid to pass through at least one non-magnetically conductive fluid flow conduit to promote the flow of a fluid through the magnetically conductive conduit.

Further, the instant invention includes an apparatus providing fluid treatment comprising a magnetically conductive conduit to receive a flow of a fluid to be treated along a path extending through the magnetically conductive conduit; an electrical conductor comprising at least one length of an electrical conducting material having a first conductor lead and a second conductor lead, the electrical conductor coiled around at least one coil core with at least one turn to form at least one uninterrupted coil of electrical conductor encircling each coil core, each coil forming at least one layer of coiled electrical conductor; means for sleeving the magnetically conductive conduit within the at least one coil core, whereby at least one turn of electrical conductor encircles at least a section of the outer surface of the magnetically conductive conduit with the coils oriented substantially orthogonal to the fluid flow; and at least one electrical power supply operably connected to at least one conductor lead, wherein the coiled electrical conductor is energized to produce a magnetic field having lines of flux directed along the fluid flow path and concentrated in a plurality of distinct areas along the longitudinal axis of the magnetically energized conduit.

The instant apparatus may further comprise at least one non-magnetically conductive fluid flow conduit to promote the flow of a fluid through the magnetically conductive conduit.

The at least one magnetically conductive conduit may comprise a length of magnetically conductive material defining a fluid impervious boundary wall with an inner surface and an outer surface and having a port at the proximal end of the conduit and a port at the distal end of the conduit.

The at least one magnetically conductive conduit may comprise a non-contiguous array of a first magnetically conductive conduit and a second magnetically conductive conduit, each magnetically conductive conduit comprising a length of magnetically conductive material defining a fluid impervious boundary wall with an inner surface and an outer surface and having a port at the proximal end of the conduit and a port at the distal end of the conduit, whereby a space between said first and second magnetically conductive conduits establishes a non-magnetically conductive region, said non-magnetically conductive region providing for a concentration of magnetic energy between said magnetically energized conduits. The first and second magnetically conductive conduits of the non-contiguous array of magnetically conductive conduit conduits may be sleeved within the boundary wall of a single coil core tube, or the first magnetically conductive conduit may be sleeved within the boundary wall of a first coil core tube and the second magnetically conductive conduit may be sleeved within the boundary wall of a second coil core tube.

The at least one magnetically conductive conduit may comprise a serial coupling of a magnetically conductive inlet conduit segment, a non-magnetically conductive intermediate conduit segment and a magnetically conductive outlet conduit segment, each conduit segment comprising a length of material defining a fluid impervious boundary wall with an inner surface and an outer surface and having a port at the proximal end of the conduit segment and a port at the distal end of the conduit segment, said serial coupling of conduit segments establishing a non-magnetically conductive region between the magnetically conductive inlet conduit segment and the magnetically conductive outlet conduit segment, said non-magnetically conductive region providing for a concentration of magnetic energy between the magnetically conductive conduit segments. The serial coupling of a conduit segments may be sleeved within the boundary wall of a single coil core tube or the serial coupling of conduit segments may be sleeved within the boundary wall of a first coil core tube and within the boundary wall of a second coil core tube.

A protective coating may be applied to the inner surface of the fluid impervious boundary wall of the at least one magnetically conductive conduit. A protective coating may be applied to the outer surface of the fluid impervious boundary wall of the at least one magnetically conductive conduit. The at least one magnetically conductive conduit may comprise a fluid impervious boundary wall having a tapered end.

A single strand of electrical conducting material may be utilized to form a single coil layer encircling the coil core or a first coil layer and a second coil layer encircling the coil core. A first strand of electrical conducting material may be utilized to form a first coil layer encircling the coil core and a second strand of electrical conducting material may be utilized to form a second coil layer encircling the coil core, said first and second coil layers preferably being coaxially disposed and having a non-magnetic stabilizing material between each layer of coiled electrical conductor to maintain the alignment of the coil layers. A protective housing may be utilized to enclose at least the coiled electrical conductor. In some embodiments of an electrical conductor forming a first layer and a second layer of electrical conductor encircling the coil core, means for disposing a plurality of spacers between the first and second coil layers may be included to establish radial spacing between the first and second coil layers.

An electrical conductor comprising a single strand of electrical conducting material may be connected to a single supply of electrical power. In instances where a first and second strand of electrical conducting material comprise the at least one coil layer, the first and second conductor leads of the first and second strands of electrical conducting material may connected in series or parallel to a supply of electrical power, or the first and second conductor leads of the first strand of electrical conducting material may connected to a first supply of electrical power and the first and second conductor leads of the second strand of electrical conducting material may be connected to a second supply of electrical power.

Increased thickness of the fluid impervious boundary wall of the at least one magnetically conductive conduit typically results in a stronger magnetic field. One means of increasing wall thickness may be achieved by sleeving a first magnetically conductive conduit within a second magnetically conductive conduit, whereby the inner surface of the boundary wall of said second magnetically conductive conduit is coaxially disposed in substantially concentric surrounding relation to the outer surface of the boundary wall of said first magnetically conductive conduit.

A non-magnetically conductive fluid flow conduit may comprise a coupling segment to promote the flow of a fluid through the at least one magnetically conductive conduit, said non-magnetically conductive coupling segment comprising a length of non-magnetically conductive material defining a fluid impervious boundary wall with an inner surface and an outer surface and having inlet and outlet ports, said inlet and outlet ports adapted to receive a segment of conduit and provide for the fluid impervious, non-contiguous connection of the at least one magnetically conductive conduit with an additional segment of conduit.

A non-magnetically conductive fluid flow conduit may comprise a length of non-magnetically conductive conduit to promote the flow of a fluid through the at least one magnetically conductive conduit, said length of non-magnetically conductive conduit comprising a length of non-magnetically conductive material defining a fluid impervious boundary wall with an inner surface and an outer surface and having fluid flow ports at each end of the conduit.

A fluid flow port at one end of the length of non-magnetically conductive conduit may be adapted to receive an end of the at least one magnetically conductive conduit, said fluid flow port providing for the fluid impervious connection of the length of non-magnetically conductive conduit with the at least one magnetically conductive conduit.

A section of the length of non-magnetically conductive conduit may be sleeved within the boundary wall of the at least one magnetically conductive conduit or a section of a first length of non-magnetically conductive conduit and a section of a second length of non-magnetically conductive conduit may be sleeved within the boundary wall of the at least one magnetically conductive conduit.

At least one chemical dispersing apparatus providing means for distributing a supply of at least one fluid treatment chemical into a feed stream may be utilized to disperse a supply of at least one chemical into the feed stream. A supply of a fluid treatment chemical may be selected from a group consisting of algaecides, biocides, pesticides, fertilizers, surfactants, coolants, petroleum production fluid additives, fuel additives and lubricant additives.

At least one contaminant separation apparatus providing means for separating and collecting a volume of contaminants from a fluid and discharging a processed feed stream having a reduced volume of contaminants carried within a treated fluid column may be utilized to treat a feed stream. A contaminant separation apparatus may be utilized to pretreat a feed stream upstream of the instant invention to extract debris and materials that could obstruct a flow path established by a fluid flow conduit or a contaminant separation apparatus may be utilized downstream of the instant invention to extract contaminants from a feedstock that has been directed through a plurality of distinct areas of magnetic fluid treatment. A contaminant separation apparatus may be selected from a group consisting of two-phase separation systems, three-phase separation systems, solids separation equipment, dewatering devices, oil/water separators, petroleum production equipment, petroleum refining systems, water filters, fuel filters and lubricant filters.

At least one fluid conditioning apparatus providing means for conditioning the flow of a feed stream directed to pass through the plurality of distinct areas of concentrated magnetic energy may be utilized to treat a feed stream. A fluid conditioning apparatus may be selected from a group consisting of laminar fluid flow conditioners, vortex inducing fluid flow equipment, static mixing devices and dynamic mixing apparatus.

In some instances it may be desirable to enclose the electrical conductor coiled around the at least one segment of magnetically conductive conduit within a protective housing to shelter it from cuts, prolonged exposure to ultraviolet sunlight or other damage that may affect the structural integrity or performance of the device. A protective housing may include a pattern of perforations to allow for the flow-through ventilation of the unit and include a fan to promote the flow of air over the coiled electrical conductor, or the electromagnetic field generator of the instant invention may be sealed within a solid-bodied enclosure.

A protective coating may be applied to the inner surfaces and the outer surfaces of the boundary walls of the at least one segment of magnetically conductive conduit. Further, an end of the boundary wall of the at least one segment of magnetically conductive conduit may be tapered.

Electromagnetic treatment may also be utilized in water conditioning. For example, the installation of the instant invention on the main water supply line of a residence may prevent the formation of scale within the piping system of the home. The effects of magnetic water treatment may significantly improve the efficiency of many appliances such as water heaters, washing machines, dishwashers and coffee makers. In regions having hard water supplies, a term used to describe water having a relatively high mineral content, magnetic water treatment provides for a significant reduction in the surface tension of such water columns. Magnetic treatment to reduce the surface tension of hard water typically results in smaller amounts of soaps or detergents being used to obtain the cleaning results that are often achieved with untreated hard water.

Similar benefits may be realized in commercial and industrial heat exchange equipment. In cooling towers, boilers and other types of heat exchangers, scale deposits may inhibit the transfer of heat carried by water to the surfaces of heat transfer equipment. Scale deposits not only form an insulating barrier that tends to reduce the efficiency of heat transfer equipment but also result in restricted flow and increased energy consumption in heat exchange systems. Magnetic water treatment prevents the formation of scale deposits that inhibit the transfer of heat in such systems. Further, the residual effects of magnetic treatment typically result in the softening of existing scale and other deposits, allowing them to disperse into a water column. A magnetically treated fluid column may be directed through separation or clarification apparatus to remove the suspended scale and other deposits from the water column, then to subsequent treatment phases, if necessary, to extract any remaining contaminants.

While chemical treatment has long been practiced to eliminate biological contaminants such as algae and bacteria in heat exchange systems, magnetic fluid treatment may also eradicate many such contaminants. Electromagnetic forces provided by the instant invention alter the functions of the cell membranes of organisms and typically cause the membranes and cell walls of many biological contaminants to collapse, providing an efficient means of biological contaminant destruction. Many biological contaminants regulate their water intake through osmosis via the electrical charge of fats and proteins in their surface membranes. Exposing feedstocks containing biological contaminants to concentrated magnetic fields drives the surface membranes of many biological contaminants to an imbalanced state by overwhelming the electrical field and the charge of the organism, thereby collapsing the cell walls and destroying the membranes. Utilization of the instant invention may be of particular utility in the destruction and elimination of many microorganisms because, unlike chemical treatment and many other means of dealing with such contaminants, bacteria and other organisms cannot develop immunity to such treatment. However, additional treatment may be required to control algae and bacteria in processes that constantly circulate the same volume of water through a system.

A traditional method of controlling algae has been the use of copper sulfate, commonly called bluestone. Copper sulfate in both crystalline and liquid forms has been used as an algaecide in water supply reservoirs for years with fair to mixed results. Large quantities of bluestone are typically required to achieve a sufficient concentration of dissolved copper sulfate to control algae. It is labor intensive, and therefore very costly to use. Effective long-term algae control is difficult because the copper quickly settles and often requires further applications. However, there is an effective alternative. A safe, simple and quick method of providing potable-quality water utilizes an algaecide/bactericide in conjunction with magnetic water treatment.

A fully dissolving liquid copper sulfate chelate offers significant improvements over other copper based products and has many advantages over bluestone and other liquid algaecides. The copper chelate self-disperses both horizontally and vertically throughout a water column, allowing copper concentrations to be easily and accurately measured and thereby providing for correct treatment rates of targeted species of algae and bacteria. Pre-treatment with a liquid copper chelate prevents the spread of algae before it can begin to bloom. Long-term control is possible without constant application, thereby relieving concerns of the contamination of sediments due to the extended use of copper.

A liquid copper chelate commonly available under the trade name of SCI-62 is registered as an algaecide/bactericide with the U.S. EPA, and certified to ANSI-NSF Standard 60 as a drinking water additive. This copper chelate provides an environmentally responsible water treatment that is non-toxic to humans and fish when used as directed. It provides long-term control without over-treatment and reduces trihalomethane (THM) precursors, shortens filter runs by reducing the turbidity caused by organic contaminants and reduces planktonic algae and bacteria that cause disease, bad taste and odors. In contrast to prior art methods of controlling algae and biological contaminants that typically result in chemical laden water requiring additional treatment to make it suitable for discharge into the environment, magnetic fluid treatment combined with the use of this liquid copper chelate results in the blowdown of boilers and cooling towers being acceptable for direct discharge into the environment. Thus, the instant invention eliminates the substantial surcharge incurred for the discharge of chemically treated blowdown into a municipal wastewater disposal system and does away with the costly storage, handling and dispensing of dangerous chemicals.

While a fundamental use of magnetic treatment may be to loosen and eliminate scale and other deposits from a piping system, it may also be utilized to overcome the forces that cause emulsions and accelerate the separation of oil and water. Oil, having a lower specific gravity, typically floats on water. However, mechanical agitation may shear the interface of distinct layers of oil floating on water so that small oil droplets become dispersed in water. These small oil droplets tend to coalesce, form larger droplets and eventually float out of suspension. However, when exposed to surfactants or other chemical agents, a thin layer of such chemicals typically coats the surfaces of the oil droplets, causing them to polarize and repel each other.

These small oil droplets remain suspended within the water and result in a substantial surface area of oil being dispersed within a water column. This increases the tendency of the oil to form a stable emulsion. Under the influence of magnetic fluid treatment, forces bonding the surfactant to the surface of the oil droplets and providing the repelling surface charges are reduced. Diminishing the electrostatic charges on the surface of the oil droplets allows previously stable emulsions to break so that the small oil droplets are free to coalesce into larger droplets and float out of the water column. The free-floating oil may then be removed by conventional oil/water separation equipment. Thus, safe, simple, chemical-free pretreatment for hydrocarbon contaminated fluid columns enhances the efficiency of oil/water separation devices.

The foregoing description of the preferred embodiment has been for the purpose of explanation and illustration. It will be appreciated by those skilled in the art that modifications and changes may be made without departing from the essence and scope of the present invention. Therefore, it is contemplated that the appended claims will cover any modifications or embodiments that fall within the scope of the invention.

What is claimed is:

1. A method of fluid treatment, comprising:
   (a) establishing a flow of a fluid to be treated along a flow path extending through a fluid entry port of a magnetically conductive conduit, wherein at least a section of an outer surface of the magnetically conductive conduit is sleeved with at least one coil core; and
   (b) establishing a magnetic field having lines of flux directed along the flow path of the fluid and concentrated in a plurality of distinct areas along a longitudinal axis of the magnetically conductive conduit.

2. The method of claim 1 further comprising directing the fluid to pass through at least one non-magnetically conductive fluid flow conduit to promote the flow of the fluid through the magnetically conductive conduit.

3. The method of claim 1 further comprising dispersing at least one fluid treatment chemical into the fluid after establishing the flow of the fluid to be treated along the flow path extending through the fluid entry port of the magnetically conductive conduit.

4. The method of claim 1 further comprising the step of directing the fluid through at least one contaminant separation process after establishing the flow of the fluid to be treated along the flow path extending through the fluid entry port of the magnetically conductive conduit.

5. The method of claim 1 further comprising the step of directing the fluid through at least one fluid flow conditioning process.

6. The method of claim 1 further comprising dispersing at least one fluid treatment chemical into the fluid before establishing the flow of the fluid to be treated along the flow path extending through the fluid entry port of the magnetically conductive conduit.

7. The method of claim 1 further comprising the step of directing the fluid through at least one contaminant separation process before establishing the flow of the fluid to be treated along the flow path extending through the fluid entry port of the magnetically conductive conduit.

8. A method of fluid treatment, comprising:
   (a) establishing a flow of a fluid to be treated along a flow path extending through a magnetically conductive conduit, wherein at least a section of an outer surface of the magnetically conductive conduit is sleeved with at least one coil core; and
   (b) establishing a magnetic field having lines of flux directed along the flow path of the fluid and concentrated in a plurality of distinct areas along a longitudinal axis of the magnetically conductive conduit.

9. The method of claim 8 further comprising directing the fluid to pass through at least one non-magnetically conductive fluid flow conduit to promote the flow of the fluid through the magnetically conductive conduit.

* * * * *